United States Patent [19]
Tsuruta et al.

[11] Patent Number: 5,237,555
[45] Date of Patent: Aug. 17, 1993

[54] DISC PLAYER

[75] Inventors: Yukiyasu Tsuruta, Kadoma; Tetsuo Noda, Ikoma, both of Japan

[73] Assignee: Sanyo Electric Co., Ltd., Osaka, Japan

[21] Appl. No.: 695,130

[22] Filed: May 3, 1991

[51] Int. Cl.⁵ .............................................. G11B 17/04
[52] U.S. Cl. ................................. 369/77.2; 369/77.1; 369/75.1
[58] Field of Search .................. 369/77.2, 77.1, 75.2, 369/75.1

[56] References Cited

U.S. PATENT DOCUMENTS

| | | | |
|---|---|---|---|
| 4,486,873 | 12/1984 | Takahashi et al. | 369/77.1 |
| 4,564,930 | 1/1986 | Funabashi et al. | 369/75.2 |
| 4,697,259 | 9/1987 | Takahashi | 369/75.2 |
| 4,722,078 | 1/1988 | Nakanishi et al. | 369/178 |
| 4,845,700 | 7/1989 | Koizumi et al. | 369/75.2 |
| 5,067,121 | 11/1991 | Einhaus | 369/77.2 |
| 5,119,357 | 6/1992 | Tsuruta et al. | 369/77.1 |

Primary Examiner—Paul M. Dzierzynski
Assistant Examiner—Kiet T. Nguyen
Attorney, Agent, or Firm—Nikaido, Marmelstein, Murray & Oram

[57] ABSTRACT

A disc player comprising a disc loading mechanism (2) for moving a tray (5) for placing a disc thereon from a disc discharge position to an intermediate position above a turntable (10) and then to a loading completed position below the intermediate position, a clamp mechanism (7) for pressing the disc into contact with the turntable (10), and signal recording-reproduction means for reproducing signals from the disc on the turntable (10) or recording signals on the disc. The clamp mechanism (7) comprises a clamp lever (71) movable toward and away from the turntable (10) with the movement of the tray (5) to thereby clamp the disc and release the disc from the clamp.

4 Claims, 19 Drawing Sheets

FIG. 4

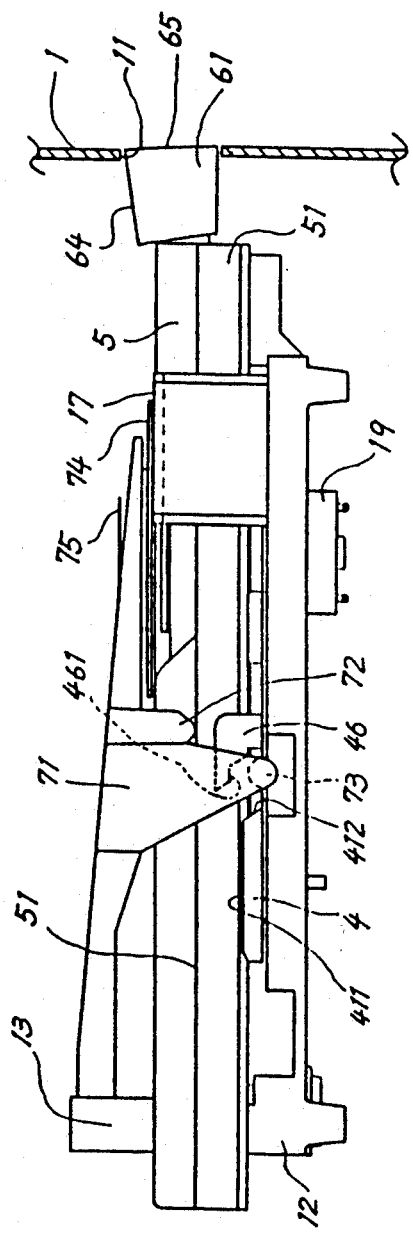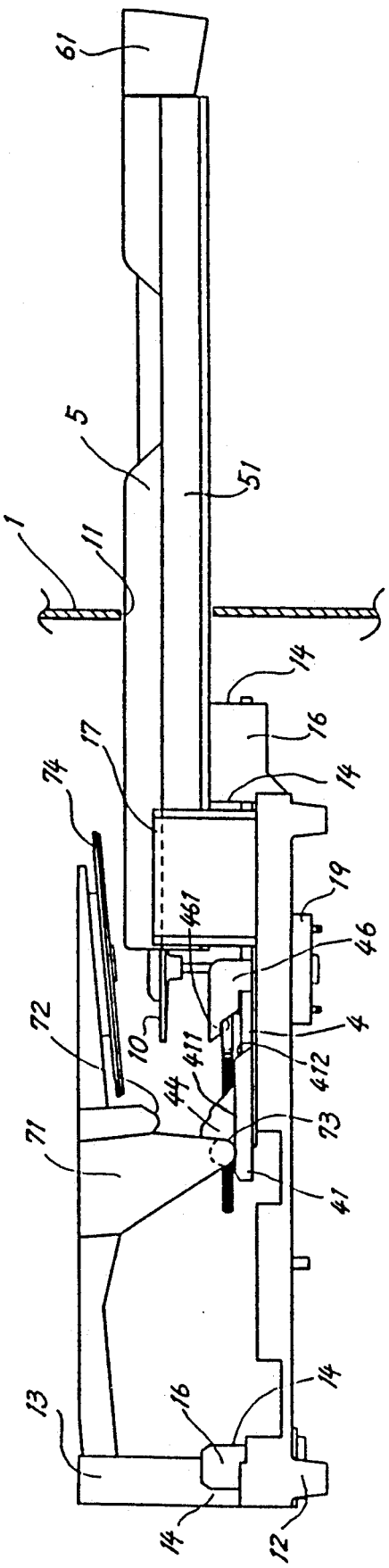

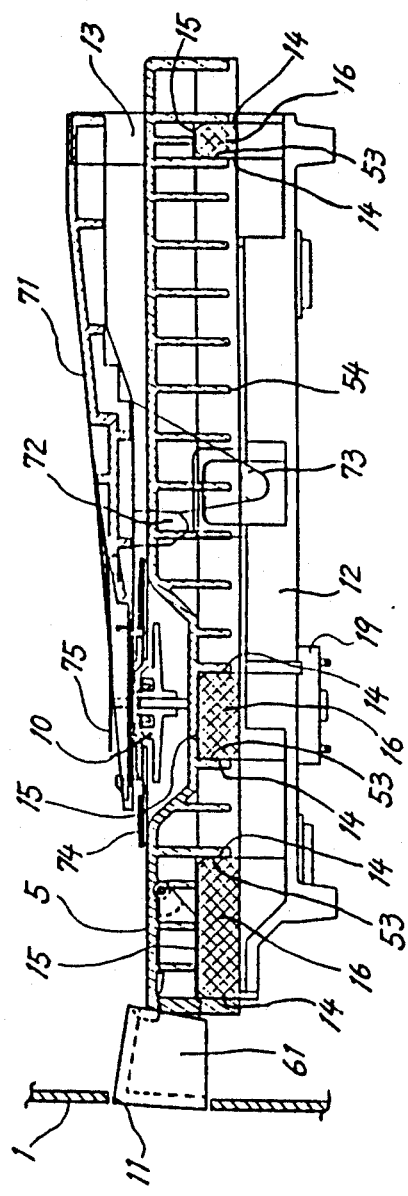
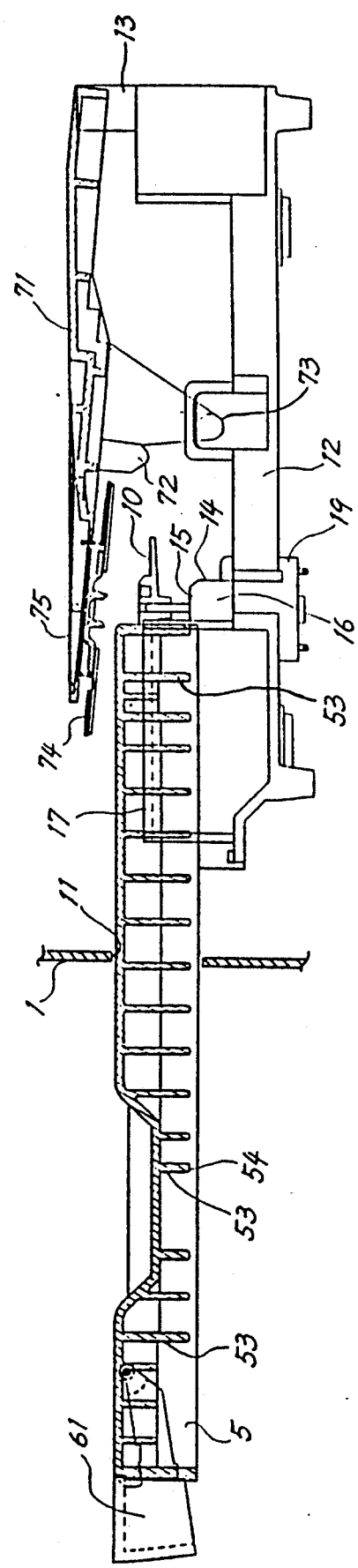
FIG.8
FIG.9

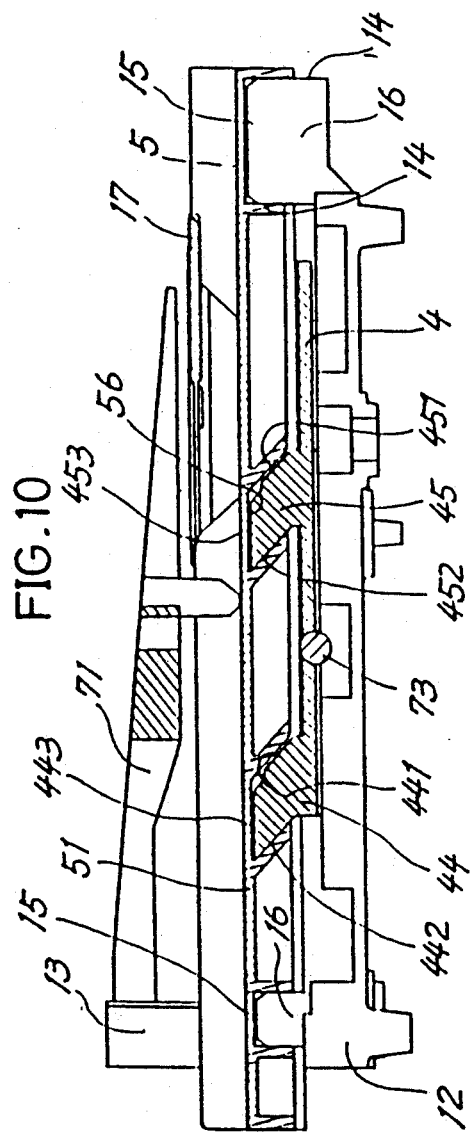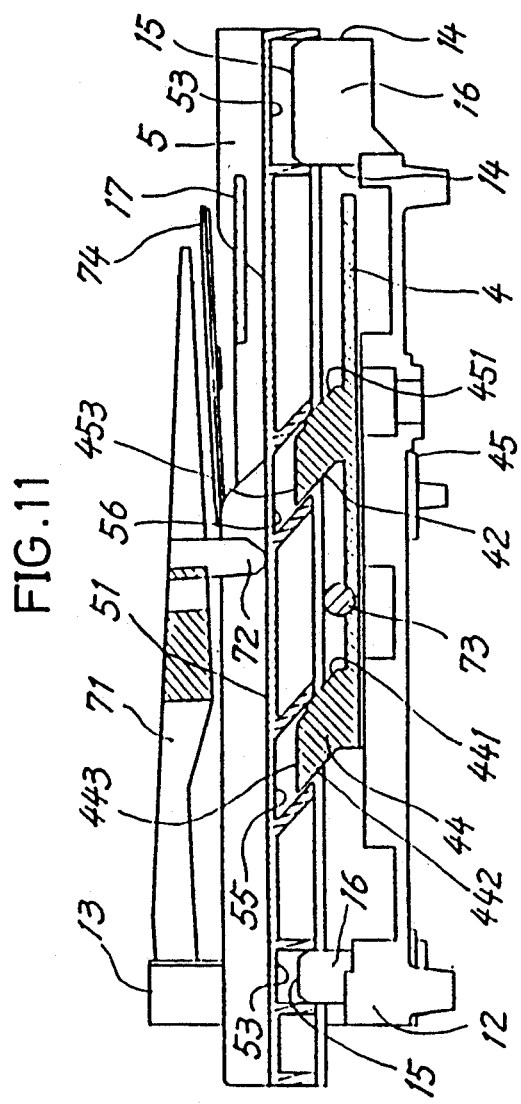

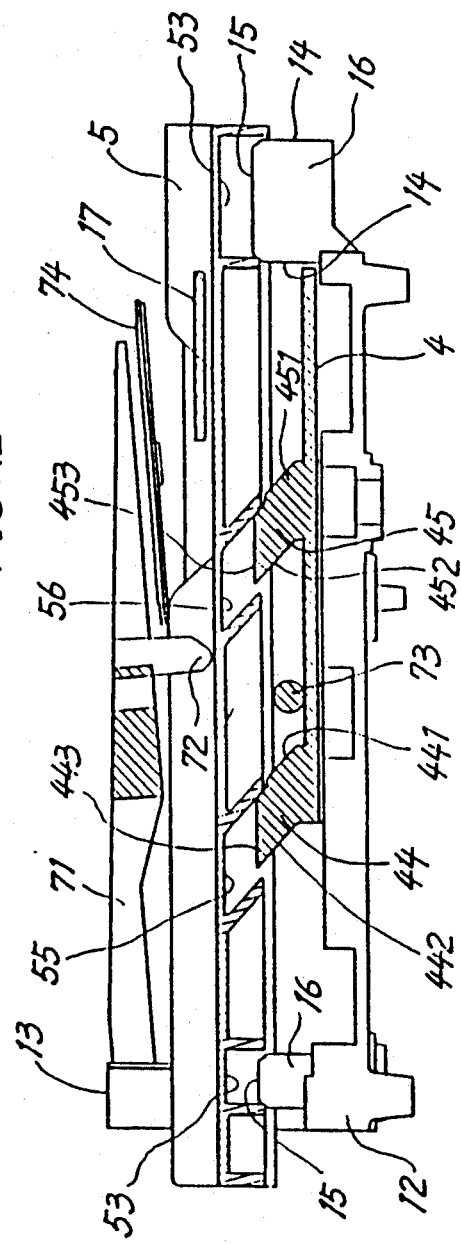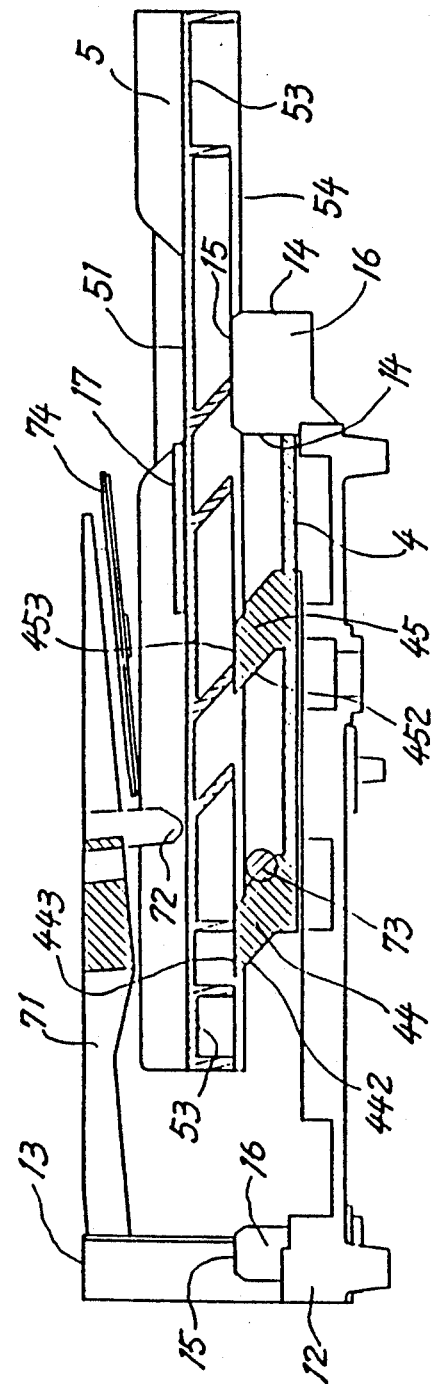

DISC PLAYER

FIELD OF THE INVENTION

The present invention relates to disc players for use with discs serving as recording media for recording signals on the disc or reproducing signals from the disc, and more particularly to disc players of the type wherein the disc is transported from a discharge position to a signal reproduction or recording position inside a cabinet by a tray provided at the front side of the cabinet and movable into and out of the cabinet.

BACKGROUND OF THE INVENTION

Disc players for reproducing audio signals from compact discs or the like having the signals recorded thereon generally have a tray provided at an opening in the front panel of a cabinet and movable into and out of the cabinet, and further include, as arranged inside the cabinet, a tray drive mechanism for driving the tray with the disc placed thereon to transport the disc toward a turntable inside the cabinet, a disc clamp mechanism for pressing the disc against the turntable, and a pickup transport mechanism for reciprocatingly transporting a pickup radially of the disc on the turntable for the pickup to reproduce signals. The opening portion of the cabinet is further provided with a shutter mechanism for closing the cabinet opening after the disc has been loaded into the cabinet.

Disc clamp mechanisms already known include, for example, those of the type wherein a clamp lever pivotally movably supported on a chassis is driven toward the turntable by a drive mechanism provided specifically therefor to clamp the disc onto the turntable. However, the clamp mechanism requires the mechanism for driving the clamp lever aside from a disc loading mechanism and therefore has the problem of making the player complex in construction.

For transporting the tray from a disc discharge position to a disc loading completed position in the innermost portion of the player, a tray drive mechanism is known which comprises a pair of guide plates provided upright on a fixed chassis at opposite sides of the tray for guiding horizontal and vertical movements of the tray, and drive plates arranged at the outer sides of the respective guide plates for pushing the tray forward. This mechanism has the problem of giving an increased lateral width to the player because the guide plates, drive plates, etc. are arranged at opposite sides of the tray.

Further a device has been proposed for driving the tray and transporting the pickup by a single motor. The proposed device requires a power transmission route change-over mechanism which is provided with a solenoid or like reciprocating drive means as a power source. The provision of the power source, however, entails the problem of increased power consumption.

Shutter mechanisms are also known for closing the cabinet front opening. This mechanism comprises a door shaped in conformity with the shape of the opening and pivoted to the opening portion of the cabinet, and a spring for biasing the door in the closing direction. However, since the door can be opened by hand from outside after the disc has been completely loaded, it is likely that extraneous matter will ingress into the cabinet.

SUMMARY OF THE INVENTION

An object of the present invention is to provide a disc player wherein the disc clamp mechanism comprises a clamp lever movable toward and away from the turntable, and a coupling mechanism for moving the clamp lever with the movement of the tray so as to move the clamp lever toward and away from the turntable by the operation of the coupling mechanism and to thereby simplify the clamp mechanism in construction.

Another object of the present invention is to provide a disc player wherein the tray is movable horizontally and vertically by being guided by a plurality of guide ribs formed on a chassis, shallow groove portions formed on the rear side of the tray for the guide ribs to slidably fit in, and deep cavity portions formed in the shallow groove portions of the tray for the guide ribs to fit in, the tray being drivable by a slide member disposed between the chassis and the tray, whereby the palyer is reduced in size, especially in its lateral width.

Another object of the present invention is to provide a disc player of the type stated above which has a disc loading mechanism comprising a rack formed on the slide member and a pinion portion meshable with the rack, and a pickup transport mechanism comprising two racks attached to pickup means, the pinion portion providing a first route of power transmission when meshing with the racks of the pickup transport mechanism or a second route of power transmission when meshing with the rack of the slide member, such that one of the two transmission routes can be changed over to the other by a change mechanism necessitating no particular power source, the two routes of power transmission thus being simplified in construction and ensuring savings in the electric power needed for the change-over.

Still another object of the present invention is to provide a disc player wherein the shutter mechanism for closing the cabinet opening after the disc has been loaded into the cabinet comprises a shutter upwardly and downwardly movably attached to the the tray at the end thereof toward the disc discharge side, the shutter being movable upward and downward with the downward and upward movement of the tray while holding the cabinet opening closed so as to simplify the shutter mechanism in construction, the shutter being holdable to the cabinet opening portion against opening when the disc has been loaded in place so as to eliminate the likelihood of extraneous matter ingressing into the cabinet.

BRIEF DESCRIPTION OF THE DRAWINGS

FIG. 4 is a plan view showing the same with the clamp lever removed in a disc unloaded state;

FIG. 6 is a left side elevation showing the disc player on completion of disc loading;

FIG. 7 is a left side elevation of the same during a disc unloading process;

FIG. 8 is a right side elevation in section of the disc player on completion of disc loading;

FIG. 9 is a right side elevation in section of the same during the disc unloading process;

FIG. 10 to FIG. 13 are a series of left side elevations in section showing the operation of the disc loading mechanism for unloading the disc;

DETAILED DESCRIPTION OF EMBODIMENT

A compact disc player embodying the present invention will be described in detail with reference to the drawings. This embodiment is given for illustrating the invention and should not be interpreted as restricting the invention as defined in the appended claims or erducing the scope thereof.

Overall Construction

Figure 1:
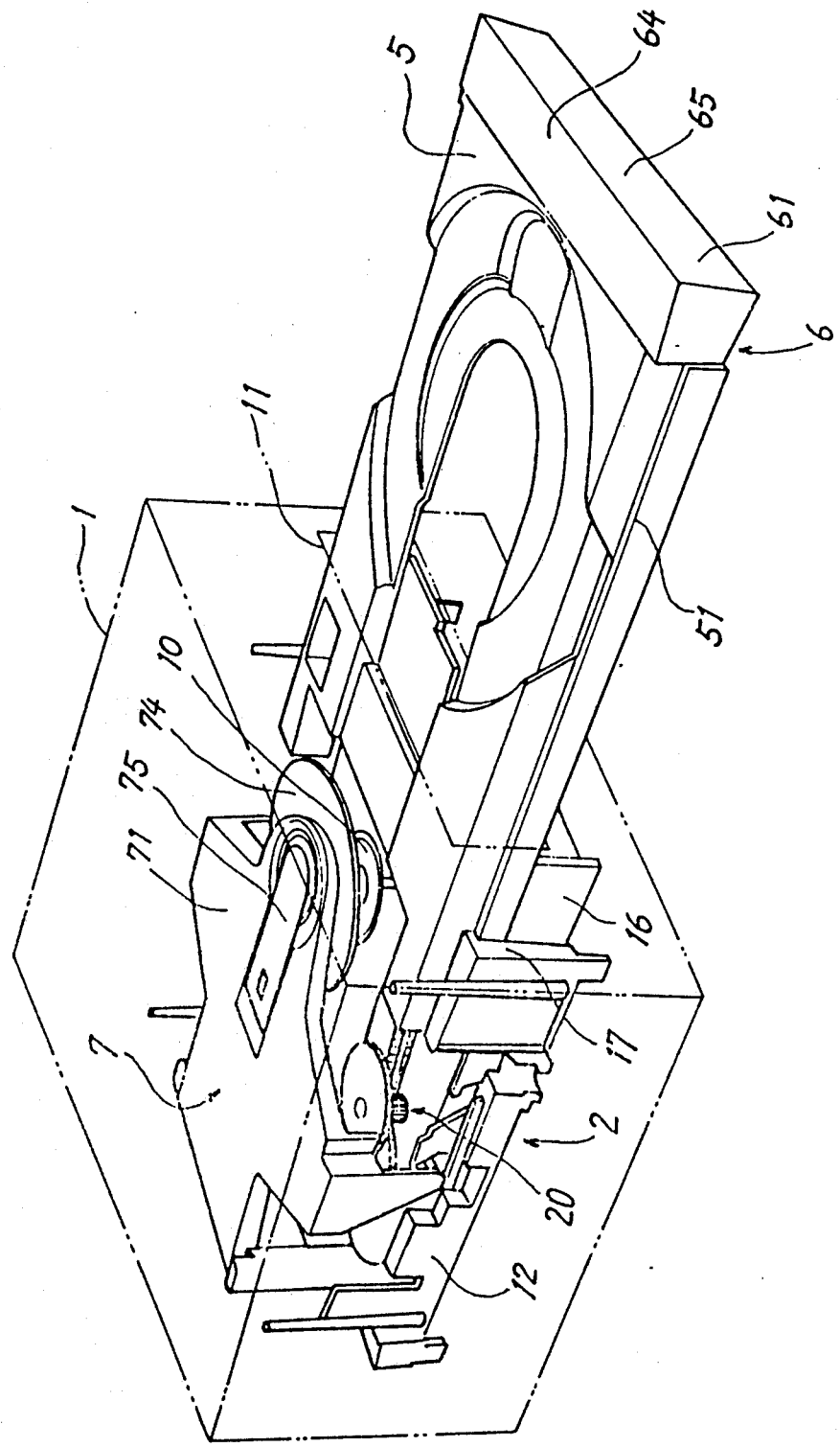
FIG. 1 is a perspective view showing the appearance of a disc player embodying the invention.

With reference to FIG. 1, a tray 5 is disposed at an opening 11 formed in the front side of a cabinet 1 and is movable into and out of the cabinet 1. Arranged inside the cabinet 1 are a turntable 10 provided on a chassis 12, a disc loading mechanism 2 for moving the tray 5 from a disc discharge position to an intermediate position above the turntable 10 and then to a loading completed position where the upper surface of the tray is at a lower level than the upper surface of the turntable 10, and a clamp mechanism 7 for pressing a disc into contact with the turntable 10.

The tray 5 is provided with a shutter mechanism 6 having a shutter 61 for closing the opening 11 of the cabinet 1 upon the tray reaching the loading completed position.

The disc loading mechanism 2 comprises the tray 5, guide means (to be described later) for guiding the tray 5 for horizontal and vertical movements, a drive assembly 20 having a main motor 21 shown in FIG. 2 and serving as its power source, a tray horizontal drive mechanism 9 coupled directly to the tray 5 for horizontally driving the tray, and tray vertical drive mechanism including a slide member 4 for transmitting power from the drive assembly 20 to the horizontal drive mechanism 9 and vertically lowering the tray 5 in engagement therewith upon the tray 5 reaching the intermediate position.

Also provided on the chassis 12 is a pickup transport mechanism 8 for reciprocatingly moving a pickup 81 radially of the disc on the turntable 10 for the pickup to read signals from the disc.

The drive assembly 20 has further incorporated therein a slip mechanism 3 which operates when an excessive load acts on the output side of the drive assembly to prevent the components of the power transmission route from breaking.

The component mechanisms of the player will be described in detail below with respect to the construction and operation thereof.

Disc Loading Mechanism

First, the drive assembly 20 of the disc loading mechanism 2 will be described.

The chassis 12 has mounted thereon a main motor 21 serving as a common power source for disc loading, disc clamping and pickup transport.

Figure 5:
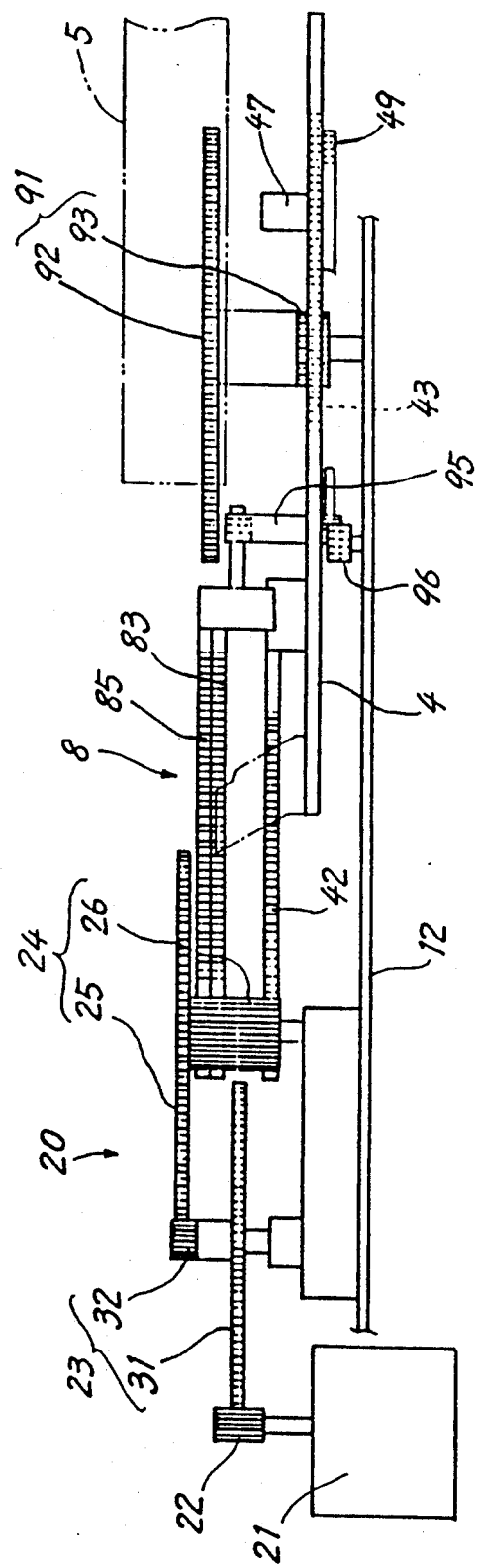
FIG. 5 is a fragmentary left side elevation of a disc loading mechanism and a pickup transport mechanism.

The drive assembly 20 for reciprocatingly driving the slide member 4 comprises a train of gears, i.e., a primary gear 22 mounted on the output shaft of the main motor 21, an intermediate gear 23 and a drive gear 24. As seen in FIG. 5, the intermediate gear 23 comprises a large gear portion 31 and a small gear portion 32, and the large gear portion 31 is in mesh with the primary gear 22. The drive gear 25 comprises a gear portion 25 and a pinion portion 26. The gear portion 25 is in mesh with the small gear portion 32 of the intermediate gear 23, and the pinion portion 26 is in mesh with a first rack 42 formed on the slide member 4.

Accordingly, the rotation of the main motor 21 reciprocatingly drives the slide member 4.

Next, the slide member 4 will be described.

Figure 4:
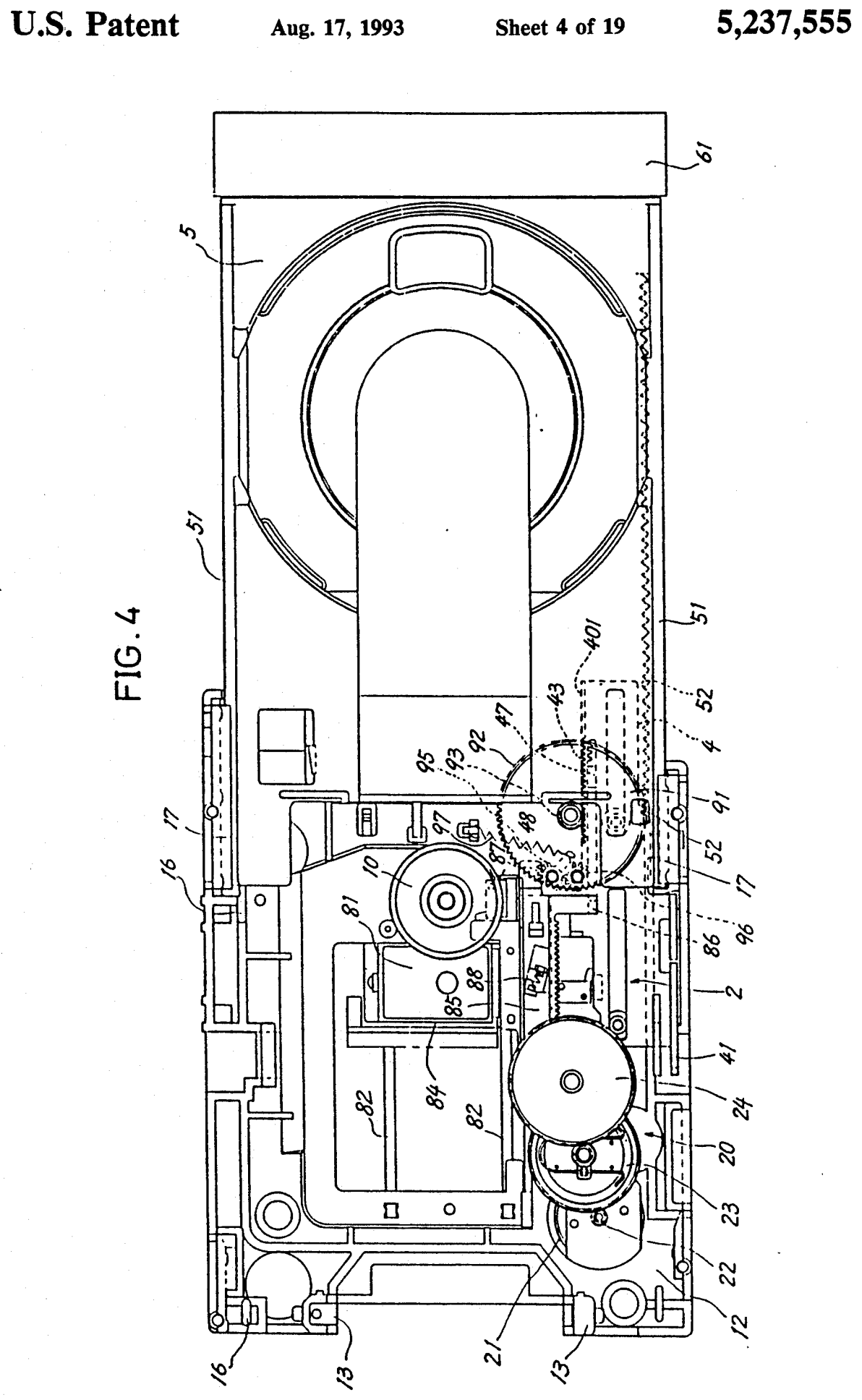
Figure 14:
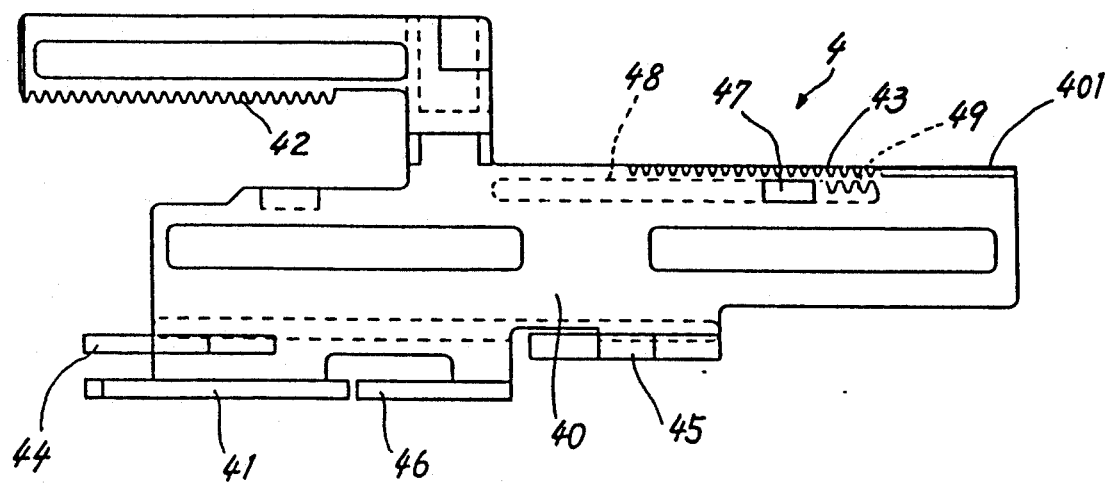
FIG. 14 is a plan view of a slide member.
Figure 15:
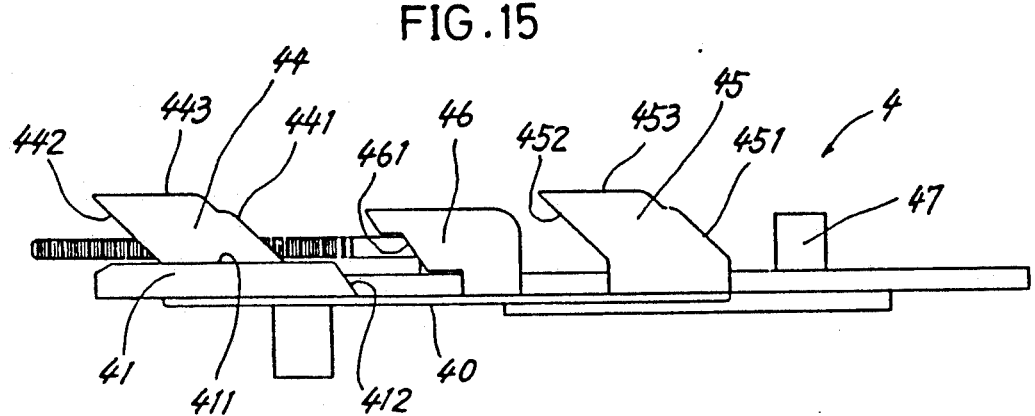
FIG. 15 is a front view of FIG. 14.
Figure 16:
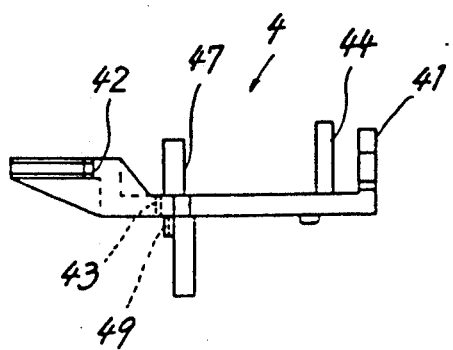
FIG. 16 is a left side elevation of FIG. 14.

With reference to FIG. 4, the slide member 4 is supported on the chassis 4 and is movable recirocatingly over a predetermined distance in the same direction (rightward and leftward in the drawing) as the horizontal movement of the tray 5. As seen in FIGS. 14 and 15, the slide member 4 comprises a body portion 40 in the form of a flat plate and formed with a horizontal cam 41 for holding a clamp lever 71 in a released position during the horizontal movement of the tray 5, the above-mentioned first rack 42, a second rack 43 for driving the tray horizontal drive mechanism 9, a third rack 49 meshable with the gear 96 to be described later, first and second cam pieces 44, 45 constituting the tray vertical drive mechanism, a third cam piece 46 for driving the clamp lever 71 toward a clamping direction, and a lug 47 engageable with an end portion of an upper rack 85 of the pickup transport mechanism 8 as will be described later.

The first and second cam pieces 44, 45 are so formed as to be positioned at opposite sides of the position of center of gravity of the tray 5 with respect to the direction of its horizontal movement when the disc is completely loaded in place as seen in FIG. 10.

Figure 23:
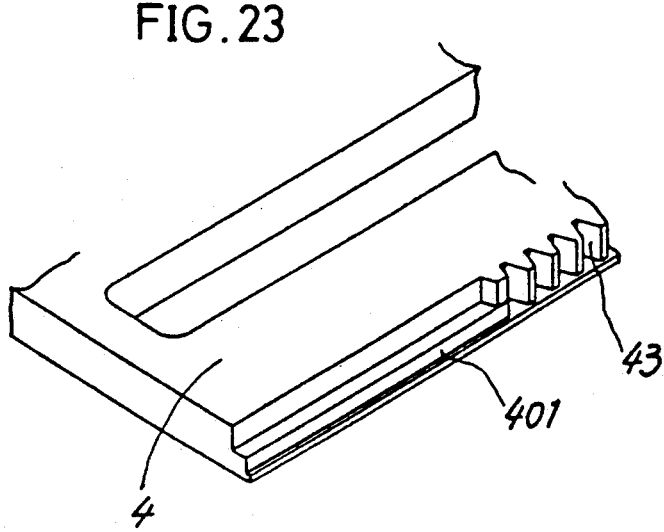
FIG. 23 is a perspective view showing a lock rib of the slide member.

The slide member 4 further has a lock rib 401 extending toward the direction of discharge of the tray from the outer end of the second rack 43 as shown in FIG. 23. The tray is locked by the rib in the intermediate position or the loading completed position as will be described later.

With reference to FIG. 15, the horizontal cam 41 has a horizontal face 411 and a slope 412. The first cam piece 44 and the second cam piece 45 have first slopes 441, 451, second slopes 442, 452 and horizontal faces 443, 453, respectively. The third cam piece 46 has a stepped slope 461 shaped in conformity with the shape of the horizontal face 411 and slope 412 of the horizontal cam 41.

Figure 21:
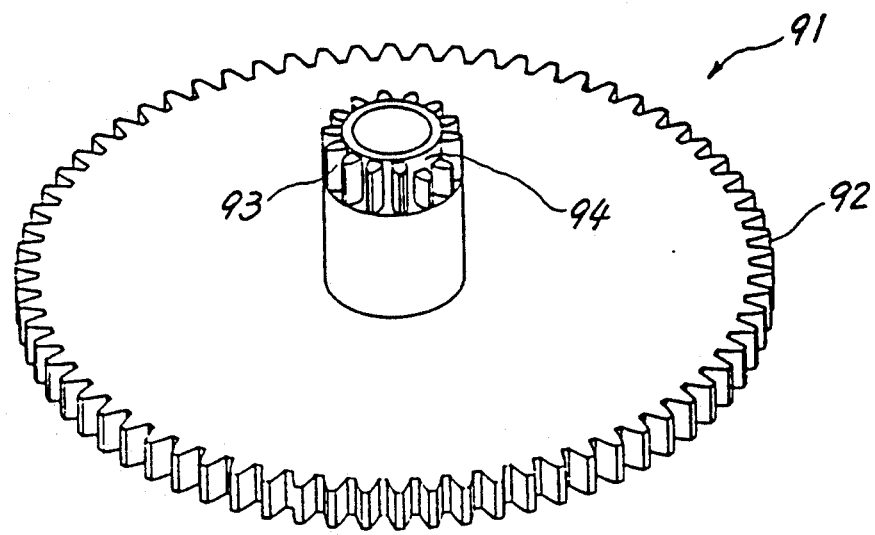
FIG. 21 is a perspective view showing a tray drive gear as turned upside.

With reference to FIG. 4, a tray drive gear 91 constituting the tray horizontal drive mechanism 9 is mounted on the chassis 12. As shown in FIG. 21, the tray drive gear 91 comprises a main gear portion 92, and a pinion portion 93 having a toothless portion 94. With the second rack 43 of the slide member 4 in mesh with the pinion portion 93 of the tray drive gear 91 as shown in FIG. 4, the gear 91 is rotated by the power delivered from the main motor 21.

A description will be given of the construction of the guide means for guiding the horizontal and vertical movements of the tray 5.

Figure 2:
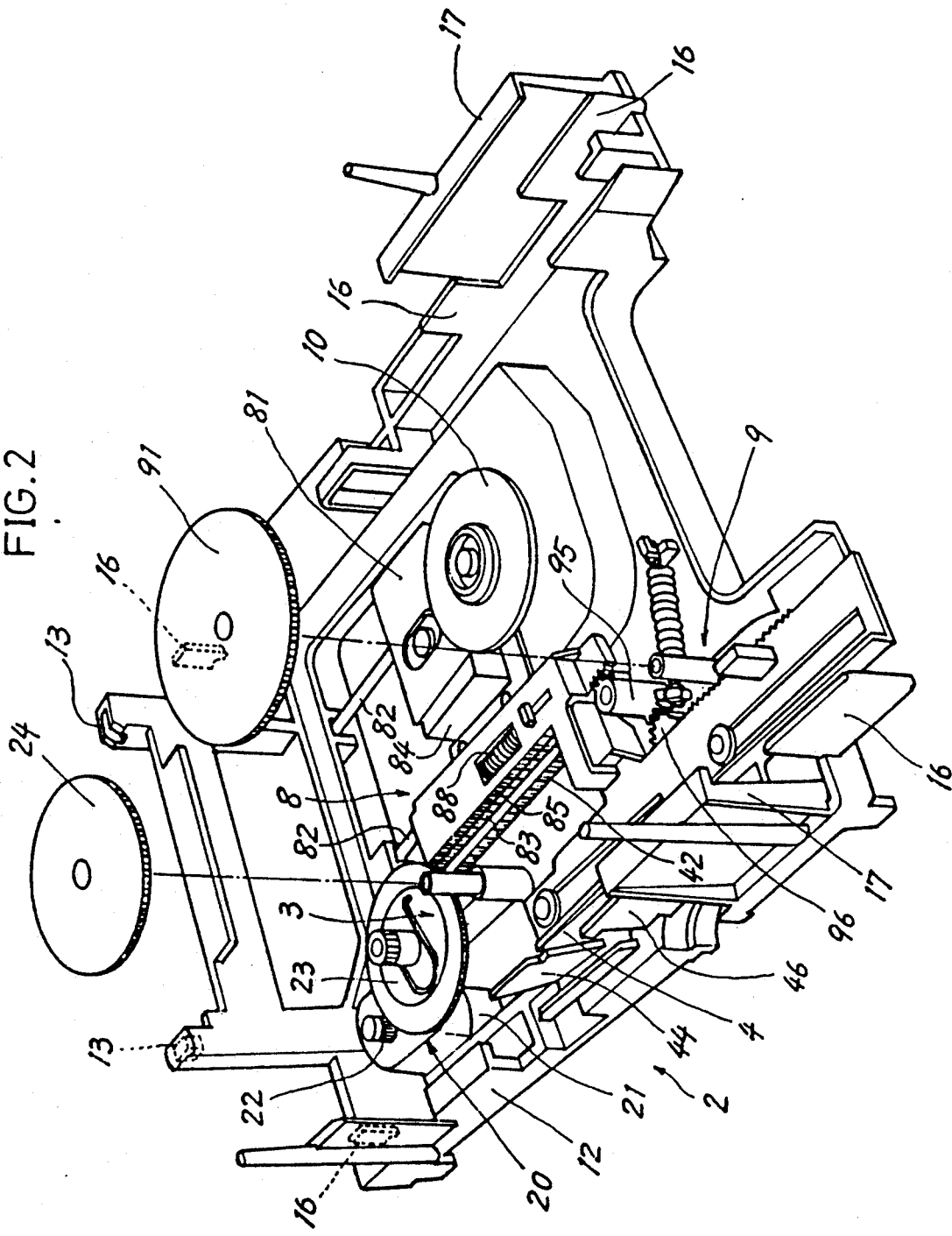
FIG. 2 is an exploded perspective view showing the disc player with a tray and a clamp lever removed therefrom.

With reference to FIGS. 1 and 2, the chassis 12 has five guide ribs 16 projecting upward therefrom and arranged at the four corners thereof and close to one of the corners for slidably supporting the tray 5, and a pair of hooks 17 disposed at opposite ends of the cabinet opening side of the chassis 12 for preventing the tray 5 from being released upward. As seen in FIG. 8, each of the guide ribs 16 has vertical guide faces 14, 14 on the front and rear sides thereof with respect to the direction of loading movement of the tray, and a bearing face 15 at its top.

As shown in FIG. 4, a rack 52 meshing with the main gear portion 92 of the tray drive gear 91 at all times extends on the rear side of the tray 5 in the direction of movement of the tray approximately over the entire length thereof. The rack 52 and the tray drive gear 91 provide the tray horizontal drive mechanism 9.

The tray 5 has flanges 51, 51 formed at the respective opposite side portions thereof and extending approximately over the entire length of the tray in the direction of its loading movement for the hooks 17 to engage with.

The upper flange 51 shown in FIG. 4 is formed on its rear side with a shallow groove portion 54 extending approximately over the entire length of the tray in the same direction as above for three of the guide ribs 16 to slidably fit in as seen in FIGS. 8 and 9. The shallow groove portion 54 is further formed with deep cavity portions 53, 53, 53 for the three guide ribs 16, 16, 16 to simultaneously engage in respectively.

The lower flange 51 shown in FIG. 4 is formed on its rear side with a shallow groove portion 54 extending approximately over the entire length of the tray in the same direction as above for the other two guide ribs 16 to slidably fit in as shown in FIGS. 10 to 13. This groove portion 54 is further formed with deep cavity portions 53, 53 for the two guide ribs 16, 16 to simultaneously engage in respectively. Between the deep cavity portions 53, 53, the tray 5 has first and second recessed portions 55, 56 in which the first and second cam pieces 44, 45 of the slide member 4 are engageable respectively. These recessed portions 55, 56 and the two cam pieces 44, 45 provide the tray vertical drive mechanism.

Thus, when the slide member 4 is reciprocatingly driven by the operation of the drive assembly 20, the second rack 43 of the slide member 4 drivingly rotates the tray drive gear 91 to reciprocatingly drive the tray 5.

The process for driving the tray 5 from the disc discharge position shown in FIG. 4 to the loading completed position shown in FIG. 3 will be described with reference to FIGS. 10 to 13. When the slide member 4 is driven in the disc loading direction, the tray 5 is first moved horizontally by this movement in sliding contact with the bearing faces 15 of the guide ribs 16 as seen in FIG. 13. When the tray subsequently reaches the aforementioned intermediate position shown in FIG. 12, the guide ribs 16, 16 on the chassis 12 start to engage in the deep cavity portions 53, 53 of the tray 5, and the first and second cam pieces 44, 45 of the slide member 4 start to engage in the first and second recessed portions 55, 56 of the tray 5. With the completion of the engagement, the disc on the tray 5 is to be located immediately above the turntable 10. The turntable 10 is mounted on the output shaft of a spindle motor 19 shown in FIG. 6.

Figure 19:
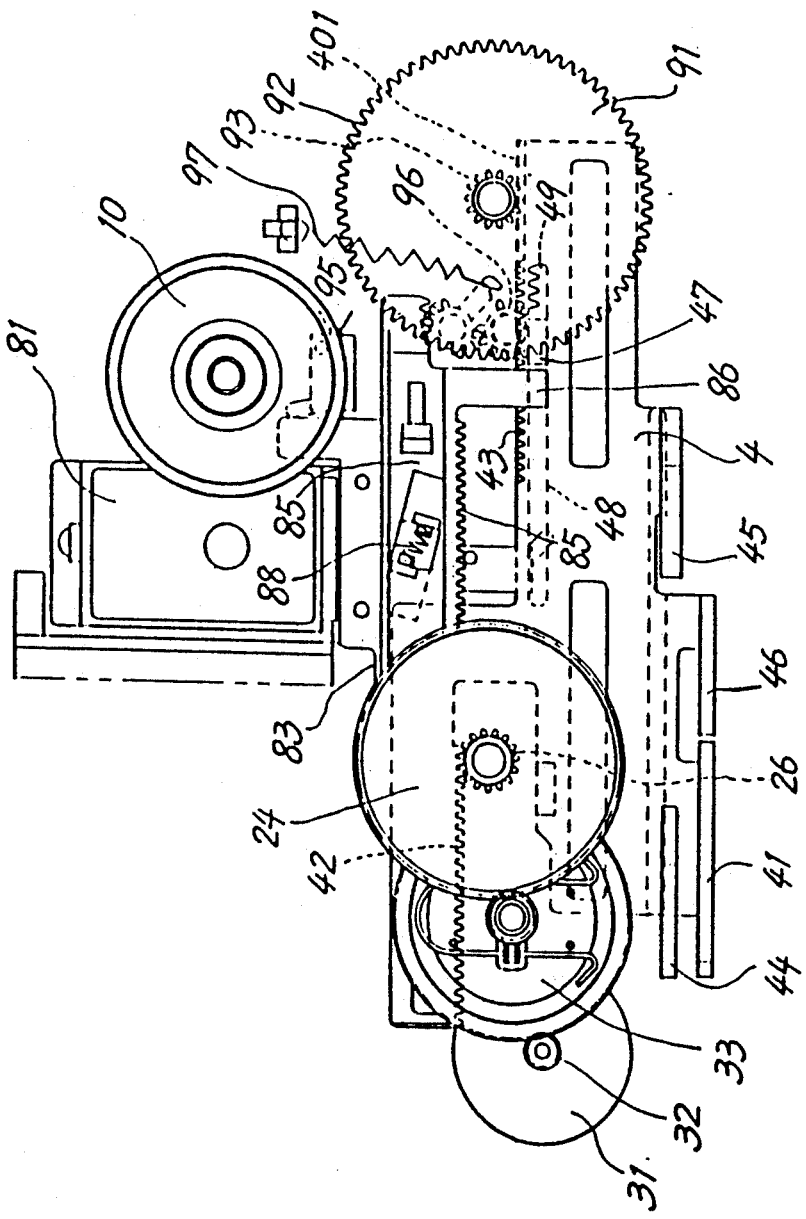

With the start of the engagement, the second rack 43 of the slide member 4 is brought out of meshing engagement with the pinion portion 93 of the tray drive gear 91, permitting the toothless portion 94 of the pinion 93 to come into engagement with the lock rib 401 of the slide member 4 as shown in FIG. 19, whereupon the gear 91 discontinues its rotation and is locked in the stopped state. Consequently, even if the slide member 4 further moves leftward thereafter, the tray drive gear 91 remains stopped, holding the tray 5 at rest without permitting the horizontal movement thereof.

When the slide member 4 is further driven leftward from this state, the cam action of the second slopes 442, 452 of the first and second cam pieces 44, 45 depresses the tray 5 as seen in FIG. 11. At this time, the vertical guide faces 14, 14 of the guide ribs 16 guide vertical descent of the tray 5. Eventually, the bearing faces 15 of the guide ribs 16 and the horizontal faces 443, 453 of the first and second cam pieces 44, 45 come into contact with the top faces of the respective deep cavity portions 53 and first and second recessed portions 55, 56 of the tray 5 as shown in FIG. 10, whereby the tray 5 is prevented from descending vertically to complete its disc loading operation. At this time, the disc support surface of the tray 5 is at a lower level than the upper surface of the turntable 10.

To move the tray 5 horizontally and vertically in the manner described above, the tray support structure shown toward the upper side of FIG. 4 also operates similarly to guide the horizontal and vertical movements. More specifically stated with reference to FIG. 9, the tray 5 is guided for the horizontal movement by the sliding contact of the guide ribs 16 on the chassis 12 with the shallow groove portion 54 of the tray 5, and the guide ribs 16 subsequently engage in the deep cavity portions 53 of the tray 5 to guide the vertical movement. When finally brought to the lowered position, the tray 5 rests on the bearing faces 15 of the guide ribs 16 as shown in FIG. 8 to complete its disc loading operation.

During the vertical descent of the tray 5 from the intermediate position to the loading completed position, the disc on the tray 5 is placed on the turntable 10, and the tray 5 only descends thereafter.

During the vertical descent of the tray 5, the rack 52 of the tray 5 remains in mesh with the main gear portion 92 of the tray drive gear 91 while moving relative thereto along the faces of the tooth.

To move the tray 5 for unloading the disc, the slide member 4 is driven rightward from its position in FIG. 10, raising the tray as seen in FIGS. 11 and 12 by the cam action of the first slopes 441, 451 of the first and second cam pieces 44, 45. Since the two cam pieces 44, 45 are disposed at opposite sides of the position of center of gravity of the tray 5 as already stated at this time, the force to lift the tray 5 will not act out of balance with respect to the front-to-rear direction. Consequently the tray 5 remains horizontal with respect to this direction.

Further when the tray 5 is raised upward, a lower jaw 73 provided on the right side of the clamp mechanism 7 shown in FIG. 1 lifts the bottom of the tray as seen in FIG. 8 to hold the tray 5 horizontal widthwise thereof. As a result, the tray 5 is raised while being held horizontal with respect to the front-to-rear direction as stated above and while being held in a horizontal posture in its entirety.

The tray 5 thereafter rides onto the bearing faces 15 of the guide ribs 16 and the horizontal faces 443, 453 of the first and second cam pieces 44, 45 as shown in FIG. 13 and is thereby guided for a horizontal movement toward the disc discharge direction.

The slide member 4 in the position shown in FIG. 19 is further driven rightward, bringing the second rack 43 of the slide member 4 into meshing engagement with the pinion portion 93 of the tray drive gear 91 again to drivingly rotate the tray drive gear 91, whereby the tray is driven horizontally.

Disc Clamp Mechanism

Figure 3:
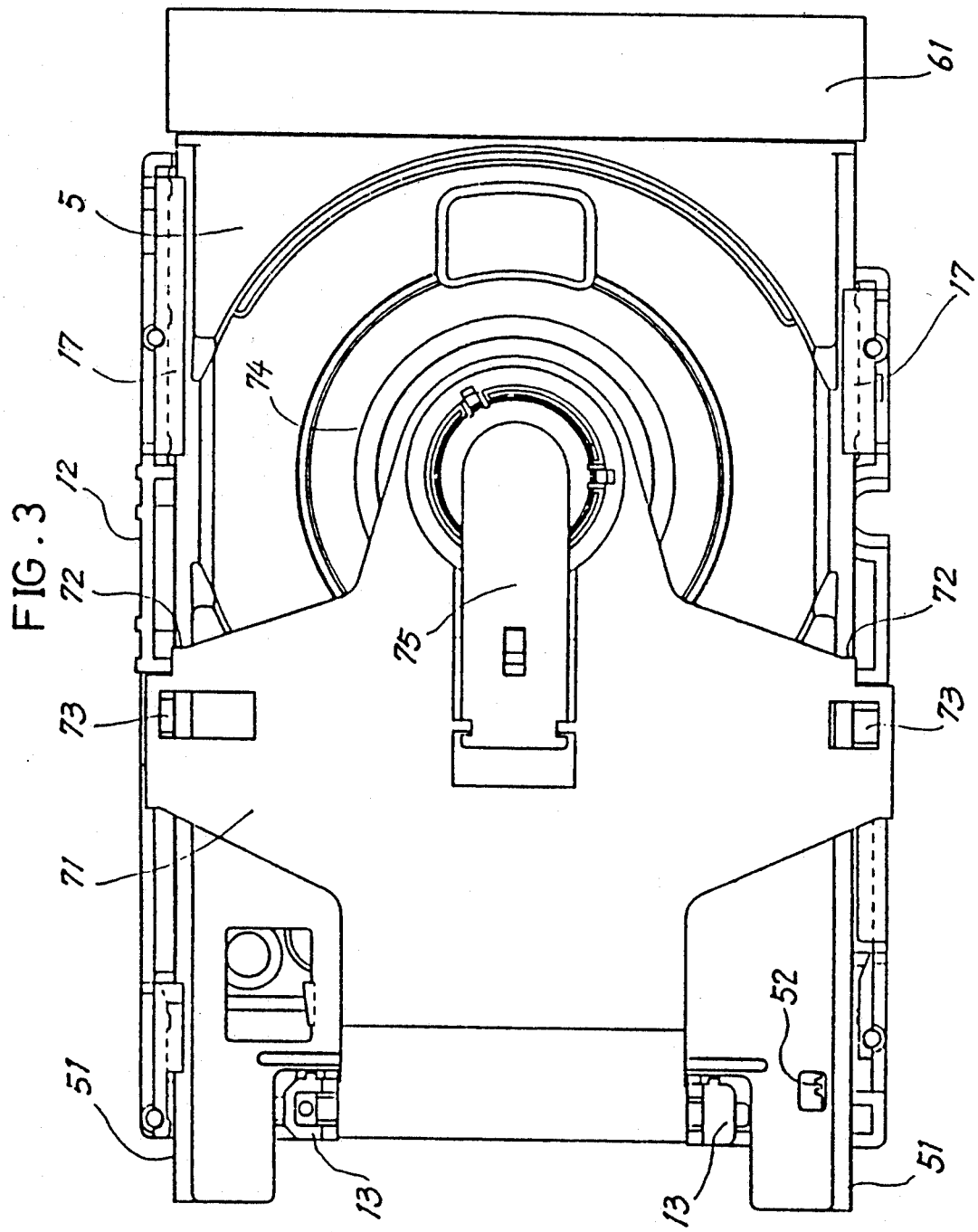
FIG. 3 is a plan view showing the disc player on completion of disc loading.

The clamp lever 71 having a clamp plate 74 for holding the disc pressed downward against the turntable 10 as shown in FIG. 1 is pivotally supported at its base end by a pair of boss portions 13, 13 provided on the chassis 12 as seen in FIGS. 2 and 3 and is movable toward and away from the turntable 10.

The clamp plate 74 is attached with an allowance to the free end of the clamp lever 71 so as to be rotatable and also movable upward and downward within a specified range about the axis of rotation, and is biased toward the turntable 10 by a plate spring 75 as shown in FIGS. 1 and 3.

The clamp lever 71 is bend downward at its opposite side portions, and each of the bent portions has an upper jaw 72 projecting downward and slidable in contact with the upper surface of the flange 51 of the tray 5 as seen in FIGS. 6 and 7. The bent portion is formed at its lower end with the above-mentioned lower jaw 73 projecting inward and slidable in contact with the lower surface of the flange 51 of the tray 5. Accordingly, each of the flanges 51 on opposite sides of the tray 5 is held between the upper jaw 72 and the lower jaw 73 of the clamp lever 71, with the result that the clamp lever 71 is pivotally movable with the upward and downward movement of the tray 5.

With reference to FIG. 7, the lower jaw 73 of the clamp lever 71 is in sliding contact with the horizontal face 411 of the horizontal cam 41 on the slide member 4 during the horizontal movement of the tray 5, whereby the clamp plate 74 is held in an upwardly moved limit position where the plate 74 is the largest distance away from the turntable 10.

Upon the tray 5 reaching the intermediate position, the lower jaw 73 of the clamp lever 71 is released from the horizontal face 411 of the horizontal cam 41 on the slide member 4 and brought into the space between the slope 412 of the horizontal cam 41 and the slope 461 of the third cam piece 46 with the movement of the slide member 4.

The slide member 4 is further driven rightward to vertically lower the tray 5. In this process, the clamp lever 71 is pivotally moved down by the cam action of the slope 461 as shown in FIG. 6, pressing the clamp plate 74 into contact with the disc on the turntable 10. Accordingly, the clamp lever 71 thus moves to clamp the disc concurrently with the vertical descent of the tray 5, and the disc clamp movement is completed generally simultaneously with the completion of disc loading movement of the tray 5.

The downward movement of the clamp lever 71 causes the upper jaws 72 of the lever 71 to depress the tray 5 as shown in FIG. 6, so that when the descent of the tray 5 is started as shown in FIGS. 12 and 11, the cam pieces 44, 45 reliably engage in the recessed portions 55, 56 as already described.

To unload the disc, the slide member 4 is driven rightward from the position of FIG. 6, raising the tray 5 and thereby lifting the upper jaws 72 of the clamp lever 71 resting on the flanges 51 of the tray 5 (see FIGS. 10 to 13). Simultaneously with this, the lower jaw 73 of the clamp lever 71 is released from the third cam piece 46 on the slide member 4, moving along the slope 412 of the horizontal cam 41 onto the horizontal face 411 thereof to slide on this face 411 as seen in FIG. 7.

Thus, the clamp lever 71 is held in its released position during the horizontal movement of the tray 5 and pivotally moved with the descent and ascent of the tray 5, causing the clamp plate 74 to clamp the disc on the turntable 10 and release the disc from the clamp.

Incidentally, the upper jaws 72 of the clamp lever 71 are positioned closer to the lever base end than the clamp plate 74, so that the clamp plate 74 moves upward at a speed greater than the speed of ascent of the tray 5. It therefore follows that after the disc has been released from the clamp plate, the disc is lifted off the turntable 10 by the tray 5 moving vertically upward.

Pickup Transport Mechanism

With reference to FIGS. 2 and 4, the pickup 81 is mounted on a base 84 which is reciprocatingly movable radially of the turntable 10 by being guided by two guide rails 82, 82 supported on the chassis 12.

The pickup transport mechanism 8 comprises a lower rack 83 fixed to one end of the base 84, the aforementioned upper rack 85 in engagement with the lower rack 83 with slight play with respect to the direction of movement of the pickup, and a spring 88 provided between the two racks 83, 85 as seen in FIG. 2.

The two racks 83, 85 are simultaneously meshable with the pinion 26 of the drive gear 24 as shown in FIG. 5. The biasing force of the spring 88 absorbs the backlash involved in the meshing engagement of the racks 83, 85 with the pinion portion 26.

Figure 17:
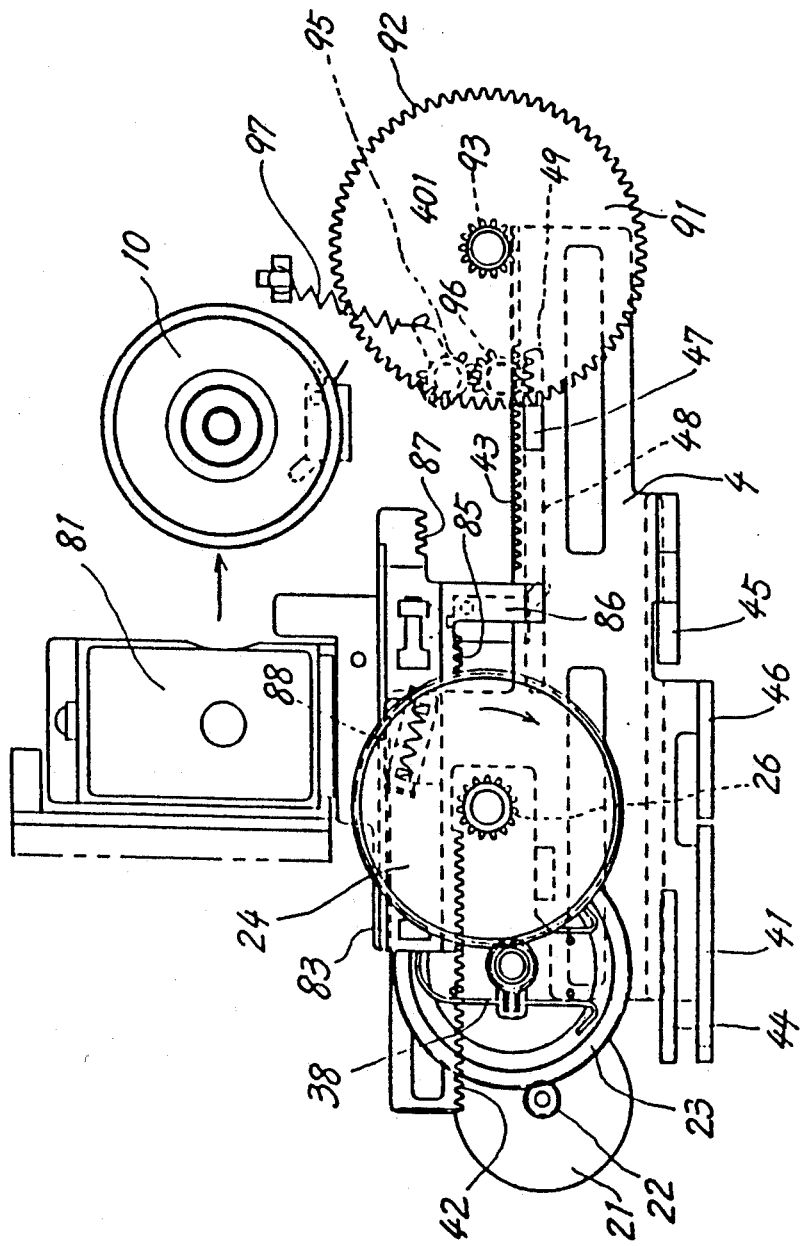
FIG. 17 to FIG. 19 are a series of plan views illustrating a change-over of power transmission route from pickup transport to tray drive.
Figure 20:
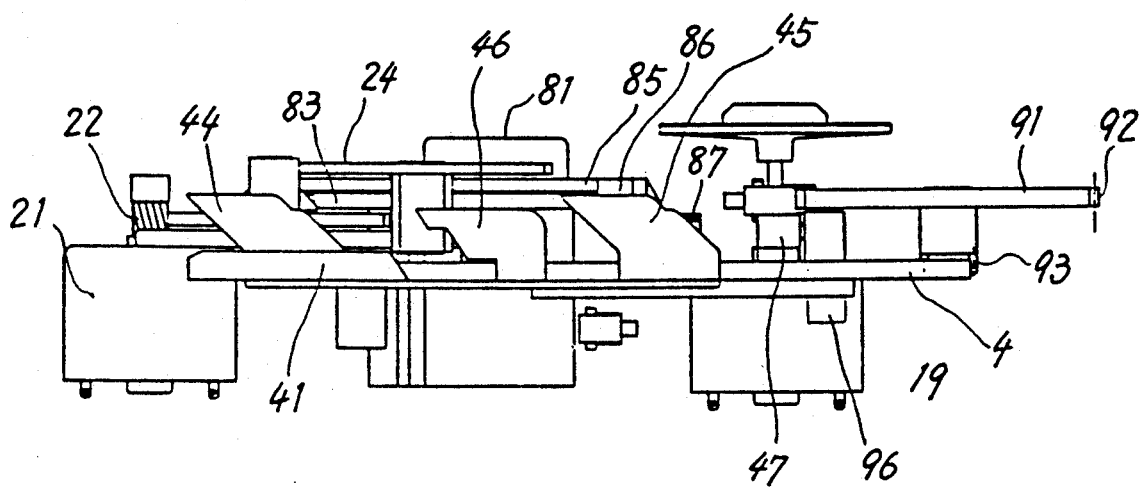
FIG. 20 is a front view of FIG. 17.

With reference to FIGS. 17 and 20, the upper rack 85 has an arm 86 adapted to come into contact with the lug 47 on the slide member 4, and an auxiliary rack portion 87 for coupling the rack 85 to the slide member 4 as will be described later.

When the racks 83, 85 are in mesh with the pinion portion 26 of the drive gear 24 after the disc has been loaded and clamped, the first rack 42 of the slide member 4 is out of mesh with the pinion portion 26 of the drive gear 24 constituting the disc loading mechanism 2, and the second rack 43 of the slide member 4 is out of mesh with the drive gear 91 constituting the tray horizontal drive mechanism 9 as shown in FIG. 17. Accordingly, the pickup 81 is transported radially of the disc for the reproduction of signals with the reciprocating movement of the slide member 4 by the operation of the drive assembly 20.

Power Transmission Route Change-Over Mechanism

According to the present embodiment as already described, a single motor is used as the power source for effecting disc loading, disc clamping and pickup transport. For this reason, there is provided a mechanism for automatically effecting a change-over between the power transmission route for disc loading and disc clamping and the power transmission route for pickup transport.

Figure 18:
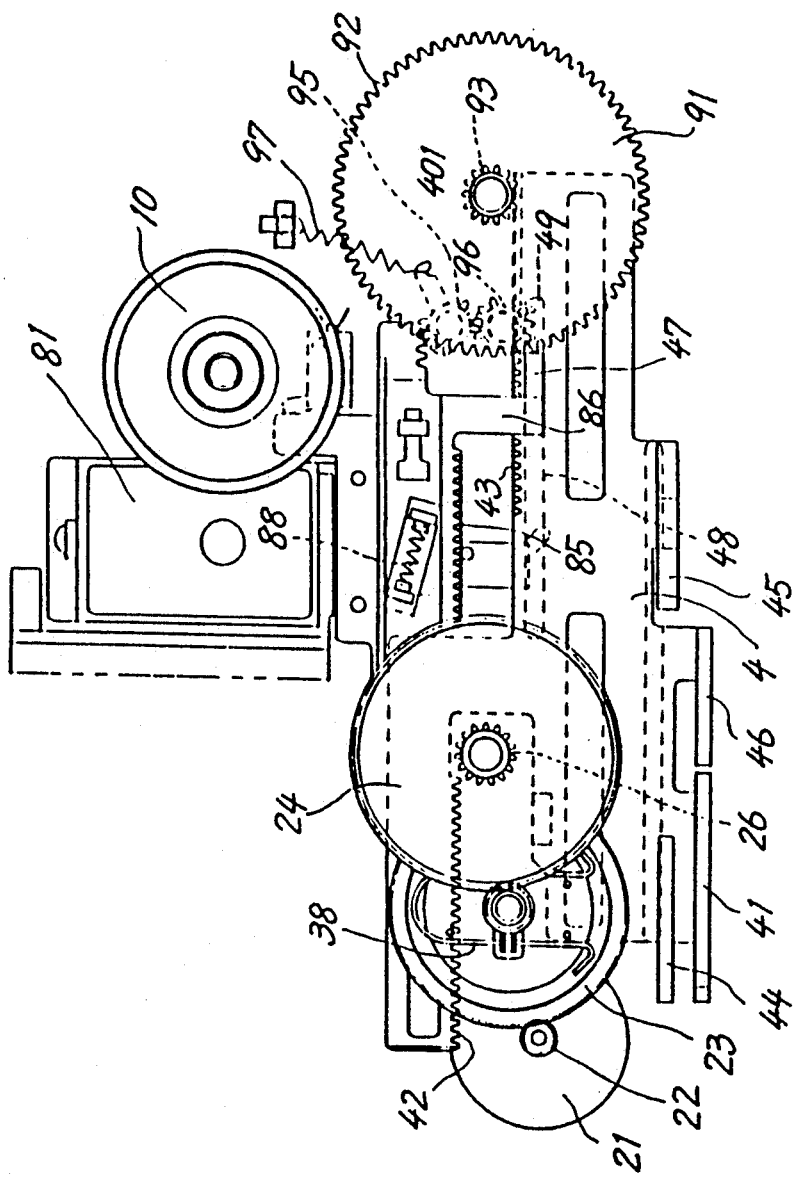
Figure 22:
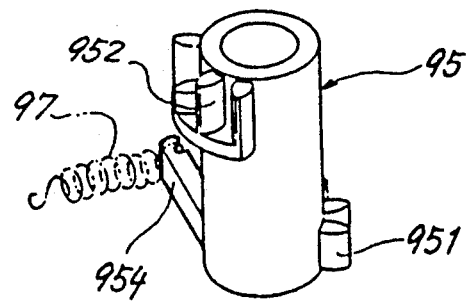
FIG. 22 is a perspective view of a first change gear.
Figure 24:
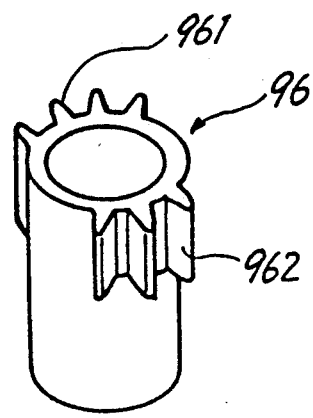
FIG. 24 is a perspective view of a second change gear.

This mechanism comprises the arm 86 and the auxiliary rack 87 of the upper rack 85 stated above, first and second change gears 95, 96 mounted on the chassis 12, a spring 97 for biasing the first change gear 95 counterclockwise, and the lug 47 and the third rack 49 formed on the slide member 4. As shown in FIG. 22, the first change gear 95 has a pinion portion 952 at its upper part, and a main gear portion 951 and an arm 954 at its lower part, with one end of the spring 97 attached to the outer end of the arm 954. Further as seen in FIG. 24, the second change gear 96 has a main gear portion 961 and a pinion portion 962. With reference to FIG. 18, the pinion portion 952 of the first change gear 95 is meshable with the auxiliary rack portion 87 of the upper rack 85, and the main gear portion 951 with the main gear portion 961 of the second change gear 96. Further the pinion portion 962 of the second change gear 96 is meshable with the third rack 49 of the slide member 4.

A description will be given below of a sequence of movements for a power transmission route change-over for the change of disc loading operation to the pickup transport operation.

With reference to FIGS. 4 and 5, during disc loading, the pinion portion 26 of the drive gear 24 is in mesh with the first rack 42 of the slide member 4, and the main gear portion 92 of the tray drive gear 91 with the second rack 43 of the slide member 4, whereas the pinion portion 26 is out of mesh with the racks 83, 85 of the pickup transport mechanism 8. At this time, the auxiliary rack portion 87 of the upper rack 85 at rest is coupled to the first change gear 95 and the second change gear 96 by meshing engagement, while the pinion portion 962 of the second change gear 96 is out of mesh with the third rack 49 of the slide member 4. Consequently, the slide member 4 will not be restrained from movement by the second change gear 96.

The first change gear 95 is biased counterclockwise by the spring 97, and the upper rack 85, positioned as slightly shifted rightward relative to the lower rack 83 at a rightward moved limit position, is biased leftward by the spring 88 in a compressed state. However, since the second change gear 96 is prevented from clockwise rotation by the engagement of its toothless cylindrical face with a rib 48 on the slide member 4, the first change gear 95 and the upper rack 85 coupled to the second change gear 96 are prevented from rotation or movement. As a result, the lower rack 83 is held in the rightward limit position by being biased by the compression spring 88 without moving the pickup 81.

Immediately before the disc is completely loaded in place, the third rack 49 of the slide member 4 meshes with the second change gear 96 as will be apparent from the change of the state shown in FIG. 19 to the state shown in FIG. 18, rotating this gear clockwise and thereby driving the first change gear 95 counterclockwise. At this time, the gear 95 is biased by the spring 97 into rotation. Consequently, the auxiliary rack portion 87 of the upper rack 85 in mesh with the first change gear 95 is driven leftward, whereby the upper rack 85, which is also biased by the spring 88, is slightly moved leftward relative to the lower rack 83 in its rightward limit position and thereby brought into meshing engagement with the pinion portion 26 of the drive gear 24. Further simultaneously with this, the pinion portion 26 is brought out of engagement with the first rack 42 of the slide member 4 as shown in FIG. 18. The upper rack 85 and the lower rack 83 are thereafter brought into specified lapping relation with each other by being biased by the spring 88, whereupon the two racks move together to simultaneously mesh with the pinion portion 26 of the drive gear 24 and transport the pickup 81 in the state shown in FIG. 17.

In this way, the route of power transmission from the main motor 21 to the tray 5 and the clamp lever 71 is smoothly changed over to the route of power transmission from the main motor 21 to the pickup 81.

The power transmission route is changed over reversely in the following manner. As the change in state from FIG. 17 to FIG. 18 shows, the pickup 81 is transported to its limit position toward the turntable 10, and the lower rack 83 is brought out of engagement with the pinion portion 26 upon reaching its rightward limit position, whereas the upper rack 85 still remains in mesh with the pinion portion 26 and is thereby further driven rightward against the spring 88. Consequently, the auxiliary rack portion 87 of the upper rack 85 comes into meshing engagement with the first change gear 95, with the arm 86 of the upper rack 85 coming into contact with the lug 47 on the slide member 4.

The upper rack 85 is further driven rightward. This movement drives the first change gear 95 clockwise, drives the second change gear 96 counterclockwise and pushes the slide member 4 rightward, consequently bringing the pinion portion 26 of the drive gear 24 into engagement with the first rack 42 of the slide member 24. With this engagement effected, the drive force of the slide member 4 is transmitted through the second and first change gears 96, 95 to the upper rack 85, which in turn is forcibly brought out of engagement with the pinion portion 26 of the drive gear 24. Simultaneously with this, the second change gear 96 is brought out of meshing engagement with the third rack 49 of the slide member 4 and into engagement with the rib 48 of the slide member 4 and is locked as seen in FIG. 19.

The slide member 4, when thus driven rightward, starts to release the disc from the clamp as already described. The second rack 43 of the slide member 4 is thereafter brought into meshing engagement with the main gear portion 92 of the tray drive gear 91 for the tray 5 to unload the disc.

In this way, the route of power transmission from the main motor 21 to the pickup 81 is smoothly changed over to the route of power transmission from the main motor 21 to the tray 5 and the clamp lever 71.

Slip Mechanism

According to the present embodiment, the slip mechanism 3 is incorporated in the intermediate gear 23 shown in FIG. 2 for preventing damage to the component members of the power transmission route when the route is subjected to an excessive load for one cause or another.

Figure 25:
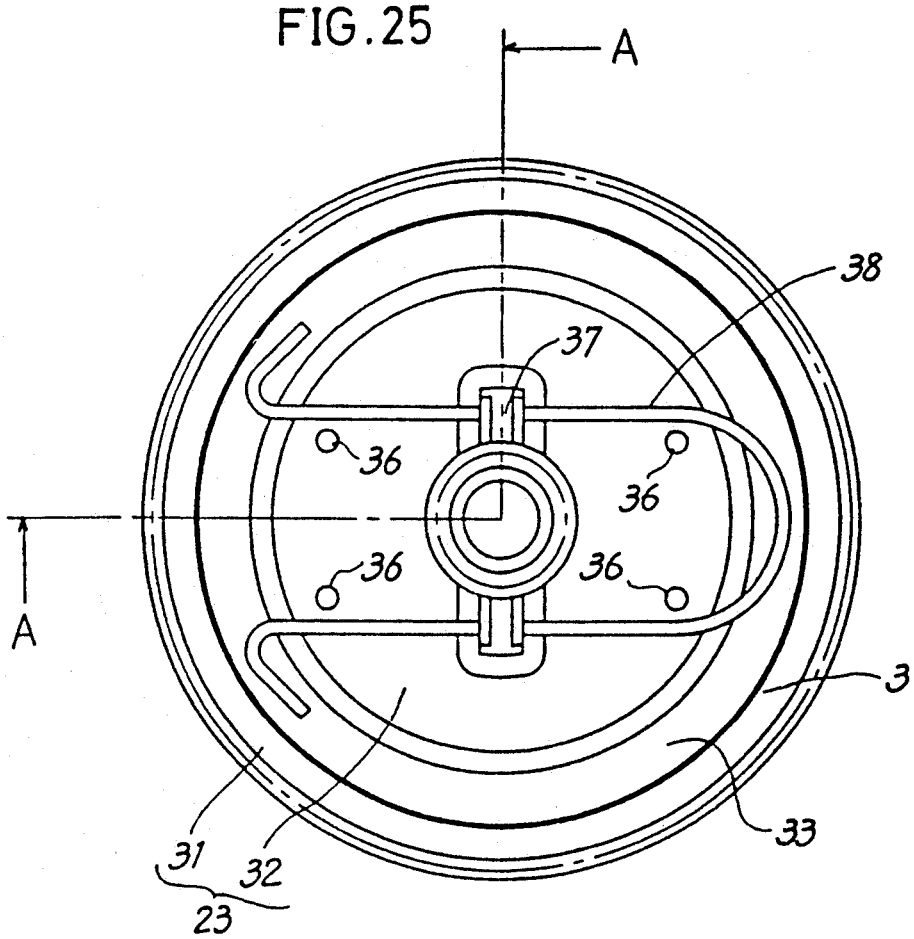
FIG. 25 is a plan view of an intermediate gear.
Figure 26:
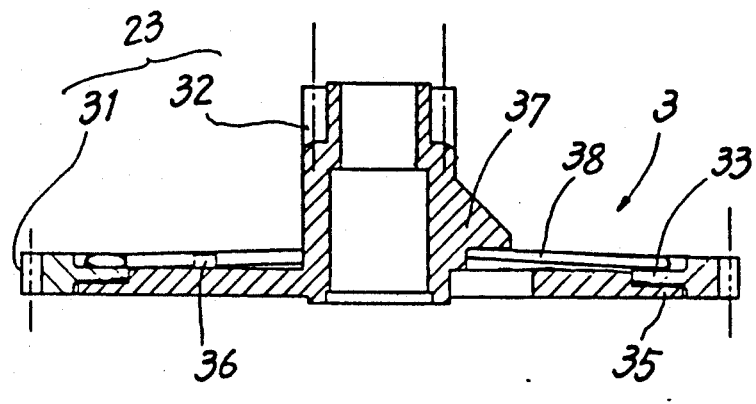
FIG. 26 is a sectional view of the same.

More specifically, the large gear portion 31 and the small gear portion 32 of the intermediate gear 23 are independent of each other as shown in FIGS. 25 and 26, engaged with each other so as to be rotatable relative to each other and pressed into contact with each other by a spring 38 so as to be rotatable together.

Figure 27:
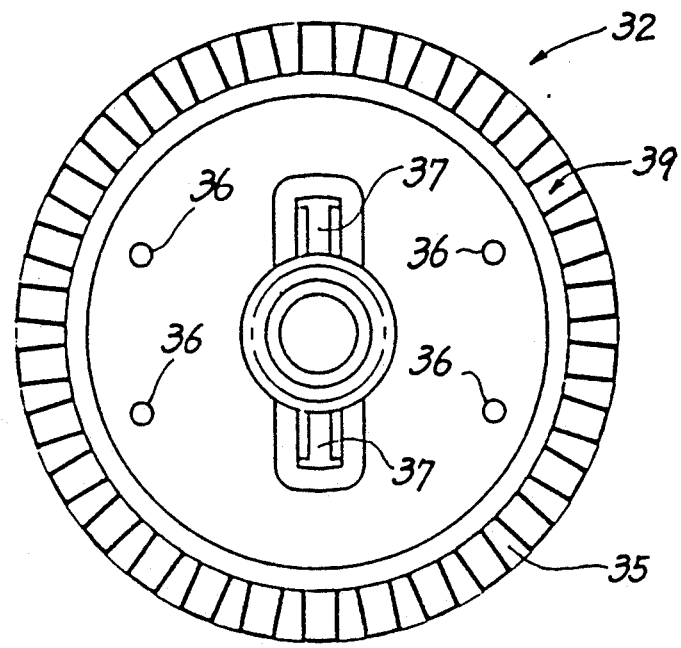
FIG. 27 is a plan view of a small gear portion.

The large gear portion 31 is in the form of a ring made of a synthetic resin having higher flexibility than the small gear portion 32, and is formed along its inner periphery with a thin flange 33 having a planar rear surface. On the other hand, the small gear 32 is provided along its outer periphery with a flange 35 which has a clutch face 39 slidable in contact with the flange 33 of the large gear 31 as seen in FIG. 27. The clutch face 39 has projections arranged with a specified pitch circumferentially thereof and each having a planar surface. The small gear portion 32 is also provided close to the toothed portion thereof with retainers 37, 37 projecting toward its outer periphery for holding the spring 38. A plurality of pins 36 for retaining the spring 38 against rotation project upward from the surface of the small gear portion 32 close to the outer periphery thereof.

The vertical inner peripheral wall of the large gear portion 31 and the vertical outer peripheral wall of the small gear portion 32 are slidable in intimate contact with each other, whereby the two gear portions are made rotatable about the same axis.

Figure 28:
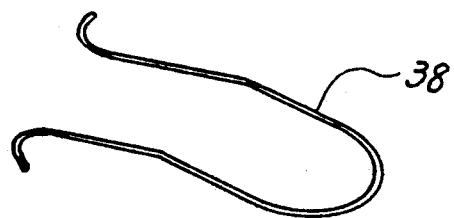
FIG. 28 is a perspective view of a spring.

The spring 38 is U-shaped as seen in FIG. 25 and so bent as to be at a higher level at the portions thereof in engagement with the retainers 37, 37 as shown in FIGS. 26 and 28. With reference to FIG. 25 showing the components as assembled, the bent portion of U-form of the spring and both spring ends opposite to this portion bear on the flange 33 of the large gear portion 31, pressing the rear surface of the flange 33 into contact with the clutch face 39 of the small gear portion 32.

Accordingly, when the intermediate gear 23 is loaded for usual disc loading or pickup transport, the large gear portion 31 and the small gear portion 32 rotate together. In this case, the clutch face 39 formed on the small gear portion 32 and having the projections acts to afford a stabilized torque for transmission. If an excessive lord acts on the output side of the large gear portion 31 for one cause or another, the small gear portion 32 slips to rotate relative to the large gear portion 31 to preclude the main motor 21 from overheating or some components of the power transmission route from breaking.

Shutter Mechanism

The shutter mechanism 6 for closing the opening 11 of the cabinet 1 shown in FIG. 1 when the disc is loaded comprises the aforementioned shutter 61 attached to the outer end of the tray 5 and pivotally movable through a predetermined angle, and a shutter closing assembly shown in FIGS. 29 to 33.

With reference to FIG. 1, the shutter 61 has a first face 64 which is held substantially flush with the surface of the tray 5 during disc loading, and a second face, i.e., a closure face 65, so shaped as to close the opening 11 of the cabinet 1.

The shutter 61 has a pair of arms 63 extending from respective opposite side portions thereof toward the tray 5 (left arm not shown in the drawing). Each of the arms 63 has a cutout 631 close to its base end and a pivot 62 projecting inward from the forward end thereof.

On the other hand, the front wall of the tray 5 has a slit 58 for each arm 63 of the shutter 61 to extend therethrough with an allowance with respect to the vertical direction. Provided on the rear side of the tray 5 are a bearing 59 carrying the pivot 62 of the shutter 61 engaged therein, and a boss 57 supporting a lever 66 for restraining the movement of the shutter 61. Accordingly, the shutter 61 is movable upward and downward about each pivot 62 within the predetermined angular range.

Figure 30:
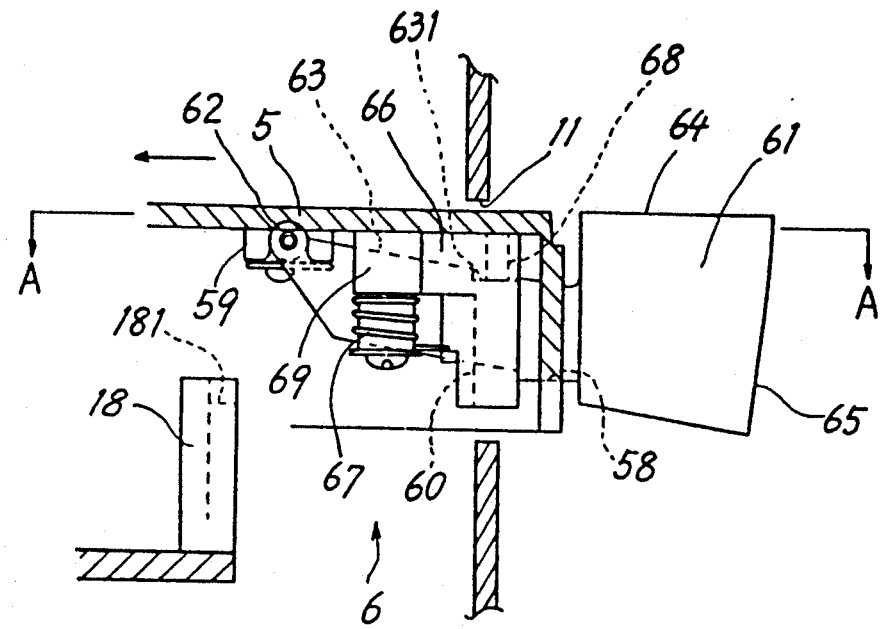
FIG. 30 is a side elevation partly broken away and showing the shutter mechanism during the horizontal movement of the tray.
Figure 31:
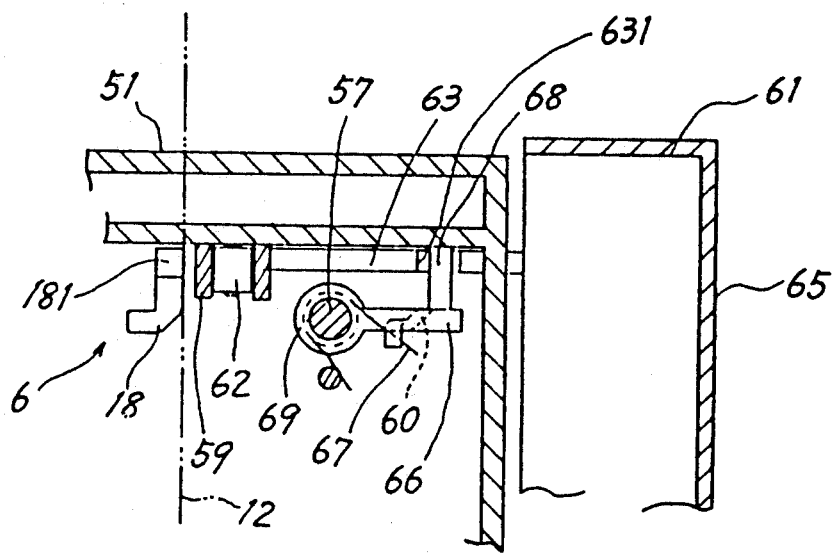
FIG. 31 is a view in section taken along the line A—A in FIG. 30.

The lever 66 has a base end pivotally movably supported by the boss 57 and is provided at its free end with a lock piece 68 engageable in the cutout 631 in the shutter arm 63, and with a cam piece 60 drivable by a pusher 18 projecting from the chassis 12 as seen in FIGS. 30 and 31.

The pusher 18 is formed with a stepped portion 181 engageable with the arm 63.

Figure 29:
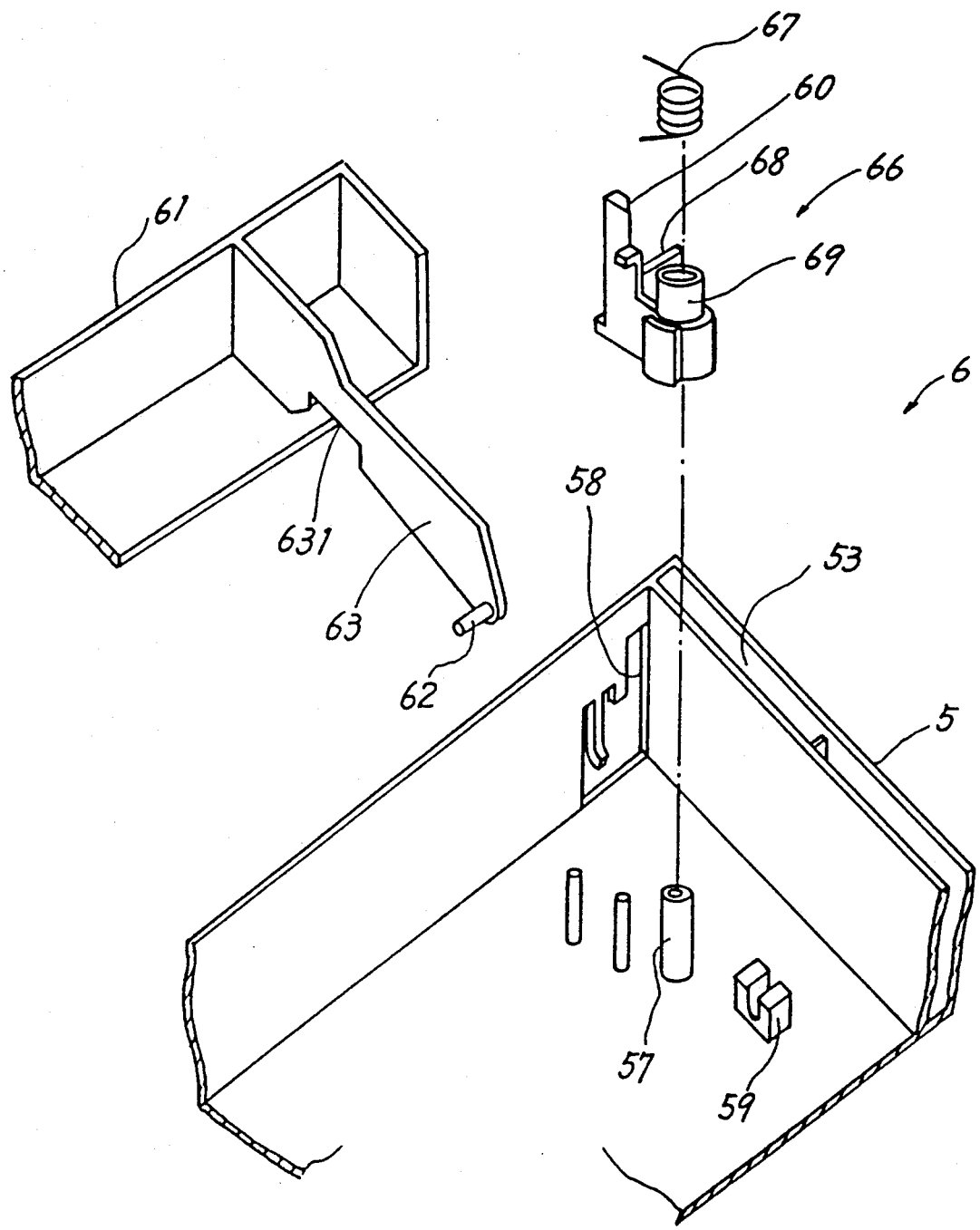
FIG. 29 is an exploded perspective view of a shutter mechanism as it is seen from the rear side of the tray.

The base end 69 of the lever 66 has a torsion spring 67 fitted therearound for biasing the lever 66 clockwise in FIG. 29.

With referece to FIGS. 30 and 31, the lever 66 is positioned in a counterclockwise limit position by being biased by the torsion spring 67 during the horizontal movement of the tray 5, with the lock piece 68 of the lever 66 fitted in the cutout 631 of the arm 63. The arm 63 is in contact with the slitted bottom face of the tray 5 and is held in a clockwise moved limit position in which the first face 64 of the shutter 61 is horizontal.

When the tray 5 reaches the intermediate position, i.e., the horizontally moved limit position, this movement of the tray 5 toward the chassis 12 causes the pusher 18 on the chassis 12 to push the cam piece 60 of the lever 66, driving the lever 66 clockwise against the torsion spring 67. This movement releases the lock piece 68 from the cutout 631 of the arm 63, rendering the arm 63 free to move counterclockwise. At this time, the cabinet opening 11 is closed with the closure face 65 of the shutter 61 (see FIG. 32).

Figure 32:
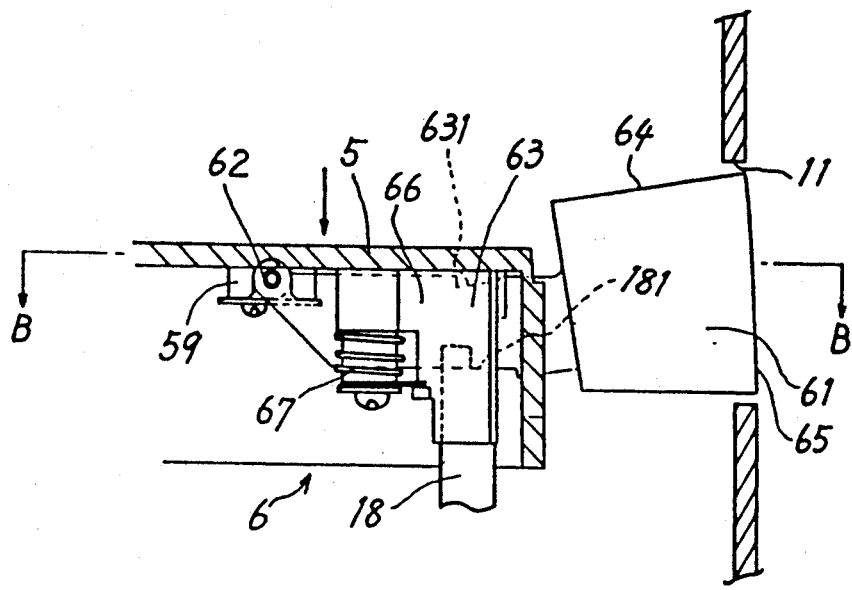
FIG. 32 is a side elevation partly broken away and showing the shutter mechanism upon completion of loading.
Figure 33:
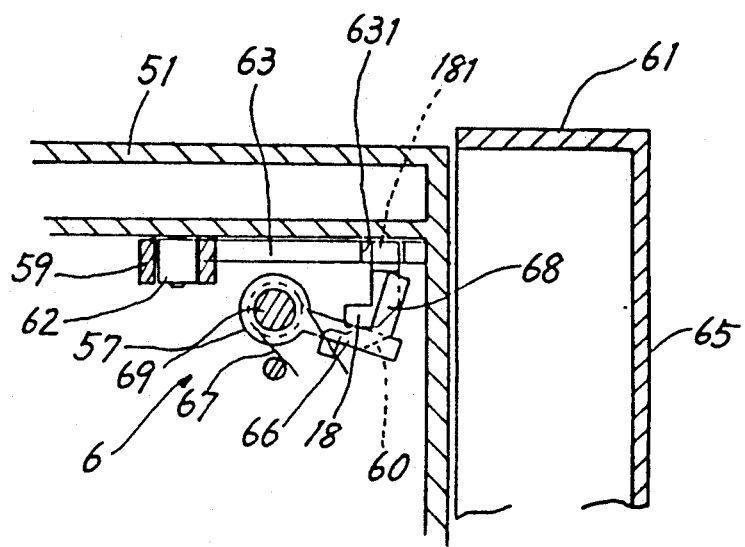
FIG. 33 is a view in section taken along the line B—B in FIG. 32.

While the tray 5 is subsequently lowered vertically, the arm 63 is prevented from clockwise rotation by the bearing contact of the arm with the stepped portion 181 of the pusher 18 on the chassis as seen in FIGS. 32 and 33, whereas since the arm 63 is free to rotate counterclockwise as stated above, the arm 63 rotates counterclockwise about the pivot 62 with the vertical descent of the tray 5. Consequently, the cabinet opening 11 is held closed with the closure face 65 of the shutter 61.

Because the shutter 61 is restrained from rotation while holding the cabinet opening 11 closed, there is no likelihood that the opening 11 will be opened inadvertently to permit ingress of extraneous matter into the cabinet.

During the vertical ascent of the tray 5 for disc unloading, the shutter 61 rotates clockwise about each pivot 62 under gravity or by virtue of contact with the opening-defining inside upper surface of the cabinet 1 and is finally brought into a state in which the first face 64 is approximately horizontal. During this process, the cabinet opening 11 remains closed with the shutter 61.

During the subsequent horizontal movement of the tray 5 toward the disc discharge direction, the pusher 18 releases the lever 66, which in turn is rotated counterclockwise by the action of the torsion spring 67. As a result, the lock piece 68 fits into the cutout 631 of the arm 63 again, preventing the counterclockwise rotation of the arm 63 as shown in FIGS. 30 and 31.

Thus, after the disc has been loaded into the cabinet, the cabinet opening 11 is reliably closed with the shutter 61 and can not be opened from outside.

With the disc player described above, the clamp lever 71 comes into direct engagement with the tray 5 or the disc loading mechanism 2, and clamps the disc and releases the disc from the clamp in operative relation with the descent and ascent of the tray 5. The clamp mechanism 7 is therefore very simple in construction.

With the disc loading mechanism 2, the tray guide means includes guide ribs 16 on the chassis 12 which directly engage with the tray 5 to guide the horizontal and vertical movements of the tray 5. Moreover, the mechanism including the slide member 4, etc. for driving the tray 5 is simple in construction and is compactly disposed in its entirety between the chassis 12 and the tray 5. Consequently, the player can be greatly reduced in size.

Furthermore, the lower rack 83 and the upper rack 85 for transporting the pickup 81 are arranged in parallel and close to the slide member 4 for driving the tray 5, and one of the rack assembly and the slide member 4 is selectively driven by the common pinion portion 26. Accordingly, the routes of power transmission are smaller in the number of component gears than in the prior art, can be free of problems such as transmission power losses and necessitate no particular power source for a change-over therebetween, hence savings in electric power consumption.

Further with the shutter mechanism 6, the shutter 61 holds the cabinet opening closed when the disc is completely loaded, consequently reliably obviating the likelihood of extraneous matter ingressing into the cabinet.

The foregoing embodiment has been given for illustrating the present invention and should not be interpreted as limiting the invention defined in the appended claims or as reducing the scope thereof. Further the components of the player of the invention are not limited in construction to those of the embodiment but can of course be modified variously within the technical scope as set forth in the claims.

What is claimed is:

1. A disc player comprising a turntable mounted on a chassis, a disc loading mechanism for moving a tray for placing a disc thereon from a disc discharge position to an intermediate position above the turntable and then to a loading completed position where the upper surface of the tray is at a lower level than the upper surface of the turntable, a clamp mechanism for pressing the disc into contact with the turntable, and signal recording-reproduction means for reproducing signals from the disc on the turntable or recording signals on the disc, wherein the disc loading mechanism comprises tray guide means for guiding horizontal and vertical movement of the tray, a tray horizontal drive mechanism for driving the tray horizontally and a tray vertical drive mechanism for driving the tray vertically, and wherein the clamp mechanism comprises a clamp lever so disposed as to be movable toward and away from the turntable and having a clamp plate for holding the disc to the turntable when positioned close to the turntable, and a coupling mechanism for moving the clamp lever with the movement of the tray, the coupling mechanism comprising:

first means for holding the clamp plate at a fixed position away from the turntable by coming into slidable engagement with a first movable portion of the disc loading mechanism moving in the same direction as the tray during the horizontal movement of the tray between the disc discharge position and the intermediate position, and second means for moving the clamp lever toward or away from the turntable by coming into engagement with a second movable portion of the disc loading mechanism during the vertical movement of the tray between the intermediate position and the loading completed position.

2. A disc player comprising a turntable mounted on a chassis, a disc loading mechanism for moving a tray for placing a disc thereon from a disc discharge position to an intermediate position above the turntable and then to a loading completed position below the intermediate position, and signal recording-reproduction means for reproducing signals from the disc on the turntable or recording signals on the disc, the disc player being characterized in that the disc loading mechanism comprises tray guide means for guiding horizontal and vertical movements of the tray, a tray horizontal drive mechanism for driving the tray horizontally and a tray vertical drive mechanism for driving the tray vertically, the tray guide means comprising:

a plurality of guide ribs provided vertically on the chassis for supporting the tray in a horizontal posture, a shallow groove portion formed on the rear side of the tray and extending in the direction of horizontal movement of the tray over a length corresponding to the distance of the horizontal movement for the guide ribs to slidably fit in, and at least one deep cavity portion formed in the shallow groove portion of the tray longitudinally thereof and in the direction of vertical movement of the tray and having a depth corresponding to the distance of the vertical movement for the guide rib to fit in during the vertical movement of the tray from the intermediate position, the tray vertical drive mechanism comprising:

a slide member provided on the chassis reciprocatingly movably along the direction of horizontal movement of the tray and having at least one cam piece projecting obliquely upward toward the shallow groove portion of the tray, at least one recessed portion formed in the shallow groove portion of the tray longitudinally thereof and shaped in conformity with the shape of the cam piece, and a drive assembly coupled to the slide member for moving the slide member to a position where the cam piece is engageable in the recessed portion of the tray when the tray is moved from the disc discharge position to the intermediate position by the operation of the tray horizontal drive mechanism and for reciprocatingly driving the slide member with the cam piece engaged in the recessed portion.

3. A disc player comprising a turntable mounted on a chassis, a disc loading mechanism for moving a tray for placing a disc thereon from a disc discharge position to an intermediate position above the turntable and then to a loading completed position below the intermediate position, pickup means for reproducing signals from the disc on the turntable or recording signals on the disc, and a pickup transport mechanism for reciprocatingly transporting the pickup means radially of the turntable, the disc player being characterized in that the disc loading mechanism comprises:

a slide member provided on the chassis and reciprocatingly movable along the path of transport of the pickup means in proximity to the path for transmitting a drive force to the tray, a rack formed on the slide member along the direction of movement thereof, and a drive assembly mounted on the chassis and having a pinion portion meshable with the rack, the pickup transport mechanism comprising:

guide means for guiding the reciprocating transport of the pickup means, and racks attached to the pickup means and movable together, the racks extending along the direction of transport of the pickup means and meshable with the pinion portion of the drive assembly, the pinion portion of the drive assembly providing a first route of power transmission when meshing with the racks of the pickup transport means or a second route of power transmission when meshing with the rack of the slide member, a route change-over mechanism being provided between the disc loading mechanism and the pickup transport mechanism for changing over one of the first and second routes of power transmission to the other by transmitting power from said one route to the other route.

4. A disc player comprising a tray disposed at an opening in the front side of a cabinet and movable into and out of the cabinet, a disc loading mechanism for horizontally and vertically moving the tray from a disc discharge position to an intermediate position above a turntable inside the cabinet and then to a loading completed position below the intermediate position, signal recording-reproduction means for reproducing signals from a disc on the turntable or recording signals on the disc, and a shutter mechanism for closing the cabinet opening after the disc has been loaded into the cabinet, the disc player being characterized in that the shutter mechanism comprises a shutter attached to the tray at the end thereof toward the disc discharge side, the shutter being so shaped in its entirety as to be movable through the cabinet opening and having a closure face at the end thereof toward the disc discharge side for closing the cabinet opening upon the tray reaching the intermediate position, the shutter being movably supported by the tray so as to move the closure face upward and downward and being reciprocatingly movable between a first position in which the closure face is substantially at the same level as the tray and a second position in which the closure face is projected upward beyond the tray, the shutter being reciprocatingly movable between the first position and the second position with upward and downward movement of the tray while holding the cabinet opening closed with the closure face.

* * * * *